United States Patent
Akhtar et al.

(10) Patent No.: US 11,132,853 B1
(45) Date of Patent: Sep. 28, 2021

(54) VEHICLE GATEWAY DEVICE AND INTERACTIVE COHORT GRAPHICAL USER INTERFACES ASSOCIATED THEREWITH

(71) Applicant: Samsara Inc., San Francisco, CA (US)

(72) Inventors: Muhammad Ali Akhtar, Oakland, CA (US); Jennifer Julia Zhang, San Francisco, CA (US); Alvin Wu, Woodridge, IL (US); Benjamin Chang, Oakland, CA (US); Joanne Wang, Los Gatos, CA (US); Katherine Yeonjune Lee, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/191,458

(22) Filed: Mar. 3, 2021

Related U.S. Application Data

(60) Provisional application No. 63/142,851, filed on Jan. 28, 2021.

(51) Int. Cl.
| | |
|---|---|
| *G07C 5/08* | (2006.01) |
| *G07C 5/12* | (2006.01) |
| *G06K 9/62* | (2006.01) |
| *G08G 1/127* | (2006.01) |
| *G07C 5/02* | (2006.01) |
| *G07C 5/00* | (2006.01) |
| *G08G 1/00* | (2006.01) |
| *B60W 40/09* | (2012.01) |
| *G08G 1/01* | (2006.01) |

(52) U.S. Cl.
CPC ......... *G07C 5/0816* (2013.01); *G06K 9/6282* (2013.01); *G07C 5/008* (2013.01); *G07C 5/02* (2013.01); *G07C 5/0841* (2013.01); *G07C 5/12* (2013.01); *G08G 1/127* (2013.01); *G08G 1/20* (2013.01); *B60W 40/09* (2013.01); *G08G 1/0112* (2013.01)

(58) Field of Classification Search
CPC ........ G07C 5/0816; G07C 5/008; G07C 5/02; G07C 5/0841; G07C 5/12; G08G 1/20; G08G 1/127; G08G 1/0112; G06K 9/6282; B60W 40/09
See application file for complete search history.

(56) References Cited

U.S. PATENT DOCUMENTS

| | | | |
|---|---|---|---|
| 5,917,433 A | 6/1999 | Keillor et al. | |
| 6,452,487 B1 | 9/2002 | Krupinski | |
| 6,505,106 B1 * | 1/2003 | Lawrence | G01M 15/05 342/357.31 |
| 6,718,263 B1 * | 4/2004 | Glass et al. | G08G 1/20 701/522 |
| 8,633,672 B2 | 1/2014 | Jung et al. | |
| 9,024,744 B2 | 5/2015 | Klose et al. | |
| 9,445,270 B1 | 9/2016 | Bicket et al. | |
| 9,477,639 B2 | 10/2016 | Fischer et al. | |

(Continued)

*Primary Examiner* — Dale W Hilgendorf
(74) *Attorney, Agent, or Firm* — Knobbe, Martens, Olson & Bear, LLP

(57) ABSTRACT

A system receives vehicle metric data from a gateway device connected to a vehicle. The vehicle gateway device gathers data related to operation of the vehicle and/or location data. The system receives data from multiple vehicles and multiple fleets. The system uses machine learning to identify cohorts for fleets. The system calculates metrics for fleets and benchmarks for the cohorts. The system presents the metrics and benchmarks in a graphical user interface.

20 Claims, 15 Drawing Sheets

(56) References Cited

U.S. PATENT DOCUMENTS

| | | |
|---|---|---|
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,390,227 B2 | 8/2019 | Bicket et al. |
| 10,579,123 B2 | 3/2020 | Tuan et al. |
| 10,609,114 B1 | 3/2020 | Bicket et al. |
| 10,623,899 B2 | 4/2020 | Watkins et al. |
| 10,827,324 B1 | 11/2020 | Hajimiri et al. |
| 10,843,659 B1 | 11/2020 | Innocenzi et al. |
| 11,046,205 B1 | 6/2021 | Govan et al. |
| 2002/0061758 A1 | 5/2002 | Zarlengo et al. |
| 2005/0286774 A1 | 12/2005 | Porikli |
| 2006/0167591 A1 | 7/2006 | McNally |
| 2008/0319602 A1 | 12/2008 | McClellan et al. |
| 2009/0240427 A1 | 9/2009 | Siereveld et al. |
| 2010/0049639 A1 | 2/2010 | Ferro et al. |
| 2010/0087984 A1* | 4/2010 | Joseph .............. G09B 19/16 701/31.4 |
| 2011/0276265 A1 | 11/2011 | Husain |
| 2012/0066030 A1* | 3/2012 | Limpert ........... G06Q 10/0639 705/7.38 |
| 2012/0136743 A1* | 5/2012 | McQuade ......... G06Q 30/0283 705/26.3 |
| 2012/0201277 A1 | 8/2012 | Tanner et al. |
| 2012/0235625 A1 | 9/2012 | Takehara |
| 2012/0256770 A1* | 10/2012 | Mitchell ............. G08G 1/127 340/989 |
| 2012/0303397 A1 | 11/2012 | Prosser |
| 2013/0007626 A1* | 1/2013 | Adams ............... G07C 5/008 715/738 |
| 2013/0162421 A1 | 6/2013 | Inaguma et al. |
| 2013/0164714 A1* | 6/2013 | Hunt et al. ......... G07C 5/008 434/65 |
| 2013/0211660 A1* | 8/2013 | Mitchell ............. G08G 1/20 701/29.3 |
| 2013/0244210 A1 | 9/2013 | Nath et al. |
| 2014/0012492 A1 | 1/2014 | Bowers et al. |
| 2014/0045147 A1* | 2/2014 | Mohn ................ H04L 67/12 434/69 |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0081162 A1* | 3/2015 | Mitchell ............. G08G 1/0129 701/32.4 |
| 2015/0081399 A1* | 3/2015 | Mitchell ............. G08G 1/0129 705/7.38 |
| 2015/0226563 A1 | 8/2015 | Cox et al. |
| 2015/0269790 A1* | 9/2015 | Batcheller et al. ..... G08G 1/20 701/537 |
| 2015/0283912 A1 | 10/2015 | Shimizu et al. |
| 2016/0086391 A1* | 3/2016 | Ricci ................ G07C 5/008 701/29.3 |
| 2016/0093216 A1* | 3/2016 | Lee ................. G06Q 50/30 340/870.11 |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0102463 A1 | 4/2017 | Hwang |
| 2017/0140603 A1 | 5/2017 | Ricci |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0188744 A1* | 7/2018 | Switkes ............. G01G 19/022 |
| 2018/0262724 A1 | 9/2018 | Ross |
| 2019/0003848 A1 | 1/2019 | Hoten et al. |
| 2019/0016341 A1* | 1/2019 | Nelson .............. B60W 40/06 |
| 2019/0118655 A1 | 4/2019 | Grimes et al. |
| 2019/0156680 A1* | 5/2019 | Sarti ................ G08G 1/20 |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2020/0074397 A1 | 3/2020 | Burda et al. |
| 2020/0135033 A1* | 4/2020 | Switkes et al. ........ G08G 1/127 |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2021/0006950 A1 | 1/2021 | Hajimiri et al. |

\* cited by examiner

VEHICLE GATEWAY DEVICE AND INTERACTIVE COHORT GRAPHICAL USER INTERFACES ASSOCIATED THEREWITH

INCORPORATION BY REFERENCE TO ANY PRIORITY APPLICATIONS

This application claims benefit of U.S. Provisional Patent Application Ser. No. 63/142,851 entitled "VEHICLE GATEWAY DEVICE AND INTERACTIVE COHORT GRAPHICAL USER INTERFACES ASSOCIATED THEREWITH" filed Jan. 28, 2021, which is hereby incorporated by reference in its entirety.

Any and all applications for which a foreign or domestic priority claim is identified in the Application Data Sheet as filed with the present application are hereby incorporated by reference under 37 CFR 1.57.

TECHNICAL FIELD

Embodiments of the present disclosure relate to vehicle gateway devices, sensors, systems, and methods that allow for efficient monitoring, management, data acquisition, and data processing for vehicles and/or fleets. Embodiments of the present disclosure further relate to devices, systems, and methods that provide interactive graphical user interfaces for vehicle and/or fleet monitoring and management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Fleet benchmarking—comparing fleets based on comparison metrics—can allow fleet managers to make decisions and improvements related to their fleets. An important aspect of fleet benchmarking can include the selection of cohorts of fleets to obtain meaningful comparisons. In other words, it is desirable to find fleets with comparable operations to control for any confounders that can create systematic biases in the comparison metrics. Attributes, such as industry or fleet size, can be used to determine cohorts.

SUMMARY

The systems, methods, and devices described herein each have several aspects, no single one of which is solely responsible for its desirable attributes. Without limiting the scope of this disclosure, several non-limiting features will now be described briefly.

Advantageously, various embodiments of the present disclosure may overcome various disadvantages of prior systems and methods. A vehicle gateway device or other device can be attached to each vehicle in the fleet. The device gathers data related to operation of the vehicle, such as vehicle metric data, in addition to location data and other data related to the vehicle. The gathered metric data, along with location data and other data related to the vehicle, can be transmitted to a management server.

The management server can receive the data from devices for many vehicles, many fleets, and over extended periods of time. The management server can aggregate and analyze the received data in various ways. For example, data may be analyzed per vehicle, per vehicle characteristic, per driver, per driver characteristic, per fleet, per cohort, or the like. The data may be used to determine vehicle fuel/energy efficiencies, correlations among vehicle metrics and fuel/energy efficiencies, a fuel/energy efficiency score, safety measurements, correlations among vehicle metrics and safety measurements, a safety score, among others. Additionally, comparisons, trends, correlations, recommendations, route optimizations, and the like may be determined. Further, reports, alerts, and various interactive graphical user interfaces may be generated.

According to various embodiments of the present disclosure, a system can include a first vehicle gateway device and a computing device. The first vehicle gateway device can be configured to gather and transmit first vehicle metric data associated with a first vehicle. The computing device can receive, from the first vehicle gateway device, the first vehicle metric data associated with the first vehicle. The computing device can receive additional vehicle metric data from a plurality of vehicle gateway devices associated with a plurality of vehicles. The computing device can determine a plurality of fleets, wherein each vehicle from the first vehicle and the plurality of vehicle vehicles is associated with a fleet from the plurality of fleets. The computing device can, for each fleet from the plurality of fleets, determine a plurality of segmentation attributes from the first vehicle metric data and the additional vehicle metric data. The plurality of segmentation attributes can include: a first attribute indicating a distance driven per vehicle, a second attribute indicating a trip length, a third attribute indicating a vehicle type composition of the fleet, and a fourth attribute indicating a type of geography. The computing device can determine a first cohort for a first fleet from the plurality of fleets based at least in part on the plurality of segmentation attributes. The computing device can present, in a graphical user interface, a plurality of visualizations for the first fleet, wherein each visualization from the plurality of visualizations indicates a metric for the first fleet relative to a benchmark for the first cohort.

In various embodiments, determining the plurality of segmentation attributes can further include: calculating a value of distance driven per unit of time by vehicles from the fleet over a period of time; and assigning the value to the first attribute.

In various embodiments, determining the plurality of segmentation attributes can further include: calculating a value representing a vehicle type composition of the fleet based at least in part on vehicle gateway devices with respective connections to the vehicles from the fleet, wherein calculating the statistical measure further comprises: determining an indicator that each respective connection uses a passenger cable; and assigning the value to the third attribute. The passenger cable can correspond to an OBD-II cable.

In various embodiments, determining the plurality of segmentation attributes can further include: calculating a value representing the type of geography based at least in part on vehicles from the fleet that started or ended a trip in a city from a plurality of predetermined cities; and assigning the value to the fourth attribute.

In various embodiments, a first visualization from the plurality of visualizations can indicate a first metric for the first fleet relative to a first benchmark for the first cohort, wherein the first metric indicates a value of at least one of harsh acceleration events, harsh braking events, or speeding for the first fleet relative to the first benchmark for the first cohort.

According to various embodiments of the present disclosure, a method can include receiving vehicle metric data from a plurality of vehicle gateway devices associated with a plurality of vehicles. The method can further include determining a plurality of fleets, wherein each vehicle from the plurality of vehicles is associated with a fleet from the plurality of fleets. For each fleet from the plurality of fleets, the method can further include determining a plurality of segmentation attributes from the vehicle metric data. The plurality of segmentation attributes can include: a first attribute indicating a distance driven per unit of time, a second attribute indicating a distance driven per vehicle, a third attribute indicating a trip length, a fourth attribute indicating number of trips per unit of time, a fifth attribute indicating number of trips per vehicle, a sixth attribute indicating total trip duration per unit of time, a seventh attribute indicating total trip duration per vehicle, an eighth attribute indicating a number of vehicles in the fleet, a ninth attribute indicating a vehicle type composition of the fleet, and a tenth attribute indicating a type of driving. The method can further include training a random forest model based at least in part on the plurality of segmentation attributes. The method can further include selecting, from the plurality of segmentation attributes, a subset of attributes based at least in part on a ranking of the plurality of segmentation attributes indicated by the random forest model. The method can further include clustering the subset of attributes that results in a plurality of clusters. The method can further include determining a first plurality of fleets associated with a first cluster from the plurality of clusters. The method can further include assigning the first plurality of fleets to a first cohort, wherein the first cohort comprises the first fleet. The method can further include presenting, in a graphical user interface, a plurality of visualizations for the first fleet, wherein each visualization from the plurality of visualizations indicates a metric for the first fleet relative to a benchmark for the first cohort.

In various embodiments, the method can further include applying a transformation function to the subset of attributes that results in transformed attributes, wherein clustering the subset of attributes further comprises clustering the transformed attributes.

In various embodiments, the transformation function can include at least one of a logarithmic function or a z-score function.

In various embodiments, the method can further include causing presentation, in another graphical user interface, of the plurality of clusters.

In various embodiments, training the random forest model can further include: providing the plurality of segmentation attributes as feature input and a plurality of metrics as label input to the random forest model.

In various embodiments, a first metric of the plurality of metrics can include a value of at least one of harsh acceleration events, harsh braking events, or speeding.

In various embodiments, determining the plurality of fleets can further include: calculating a value from respective vehicle metric data associated with a second fleet; determining that the value fails to satisfy a threshold; and in response to determining that the value fails to satisfy the threshold, excluding the second fleet from the plurality of fleets.

According to various embodiments of the present disclosure, a method can include receiving vehicle metric data from a plurality of vehicle gateway devices associated with a plurality of vehicles. The method can further include determining a plurality of fleets, wherein each vehicle from the plurality of vehicles is associated with a fleet from the plurality of fleets. For each fleet from the plurality of fleets, the method can further include determining a plurality of segmentation attributes from the vehicle metric data. The plurality of segmentation attributes can include: a first attribute indicating a first driving characteristic, a second attribute indicating a second driving characteristic, a third attribute indicating fleet size, a fourth attribute indicating fleet composition, and a fifth attribute indicating a type of geography. The method can further include training a tree-based model based at least in part on the plurality of segmentation attributes. The method can further include selecting, from the plurality of segmentation attributes, a subset of attributes based at least in part on a ranking of the plurality of segmentation attributes indicated by the tree-based model. The method can further include clustering the subset of attributes that results in a plurality of clusters. The method can further include determining a first plurality of fleets associated with a first cluster from the plurality of clusters. The method can further include assigning the first plurality of fleets to a first cohort, wherein the first cohort comprises the first fleet. The method can further include presenting, in a graphical user interface, a visualization for the first fleet, wherein the visualization indicates a metric for the first fleet relative to a benchmark for the first cohort.

In various embodiments, the subset of attributes can include the first attribute, the second attribute, the fourth attribute, and the fifth attribute, and wherein: the first attribute indicates a distance driven per vehicle, and the second attribute indicates a trip length.

In various embodiments, training the tree-based model can further include: providing the plurality of segmentation attributes as feature input and a plurality of metrics as label input to the tree-based model.

In various embodiments, determining the plurality of fleets can further include: calculating a value from respective vehicle metric data associated with a second fleet; determining that the value satisfies a threshold; and in response to determining that the value satisfies the threshold, including the second fleet in the plurality of fleets.

In various embodiments, the metric can indicate a value of at least one of harsh acceleration events, harsh braking events, or speeding for the first fleet relative to the benchmark for the first cohort.

In various embodiments, the visualization can include a graph and each of the metric and the benchmark are visually represented on the graph.

In various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays. A management server can provide an analysis graphical user interface that allows a user to review the vehicle metrics, benchmarks, and/or summary data in substantially real-time. As new vehicle metrics are received, the graphical user interface can dynamically update, such as by recalculating benchmarks.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, vehicle gateway devices, and may enable a user to more quickly and accurately access, navigate, assess, and digest analyses, vehicle metric data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., vehicle gateway devices or management server(s)), automatic and dynamic execution of complex processes in response to the input delivery (e.g., execution of processes to calculate benchmarks), automatic interaction among various components and processes of the system, and automatic and dynamic updating of the user interfaces (to, for example, display the benchmarks). The interactions and presentation of data via the interactive graphical user interfaces described herein may accordingly provide cognitive and ergonomic efficiencies and advantages over previous systems.

Various embodiments of the present disclosure provide improvements to various technologies and technological fields, and practical applications of various technological features and advancements. Some existing systems are limited in various ways, and various embodiments of the present disclosure provide significant improvements over such systems, and practical applications of such improvements. For example, existing methods for selecting cohorts may rely on human intuition to group fleets for comparison purposes. Rather, as described herein, the techniques and solutions of the present disclosure can overcome intuitive biases in existing methods by using machine learning, and specifically tree-based modeling such as random forest models. An advantage of tree-based models such as random forest models is that they can include feature importance evaluation. Accordingly, using tree-based artificial intelligence modeling can advantageously lead to unintuitive selections of attributes that can be used to determine cohorts. For example, as described herein, in some test cases fleet size and industry intuitively seemed like attributes that would be useful for comparison metrics; however, the tree-based model results indicated that those attributes were not predictive of the comparison metrics. In contrast, other non-intuitive attributes were identified by the random forest model tests that were backed up by feature importance evidence. Therefore, use of tree-based models described herein, in some cases, provide significant advantages over existing methods for cohort determination.

Additionally, various embodiments of the present disclosure are inextricably tied to, and provide practical applications of, computer technology. In particular, various embodiments rely on detection of user inputs via graphical user interfaces, calculation of updates to displayed electronic data based on user inputs, automatic processing of received data, and presentation of updates to displayed data and analyses via interactive graphical user interfaces. Such features and others are intimately tied to, and enabled by, computer, vehicle diagnostic, and vehicle technology, and would not exist except for computer, vehicle diagnostic, and vehicle technology. For example, the vehicle reporting and management functionality and interactions with displayed data described below in reference to various embodiments cannot reasonably be performed by humans alone, without the computer and vehicle technology upon which they are implemented. Further, the implementation of the various embodiments of the present disclosure via computer technology enables many of the advantages described herein, including more efficient interaction with, and presentation and analysis of, various types of electronic data, including fleet management data, and the like.

Further, by virtue of electronic communication with vehicle diagnostic systems and devices, various embodiments of the present disclosure are inextricably tied to, and provide practical applications of, computer vehicle technology. For example, the vehicle gateway devices described herein connect to vehicles via protocol(s), such as Controller Area Network (CAN), Local Interconnect Network (LIN), OBD-II or OBD2, and/or J1939. Moreover, the data collected is inherently tied to vehicles, such as, as fuel level, engine revolutions per minute (RPM), speed, engine torque, engine load, brake use, etc. Various embodiments rely on interpreting and processing the raw vehicle data. Accordingly, some of the solutions and techniques described herein are intimately tied to, and enabled by, computer, vehicle diagnostic, and vehicle gateway technology, and would not exist except for computer, vehicle diagnostic, and vehicle gateway technology.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
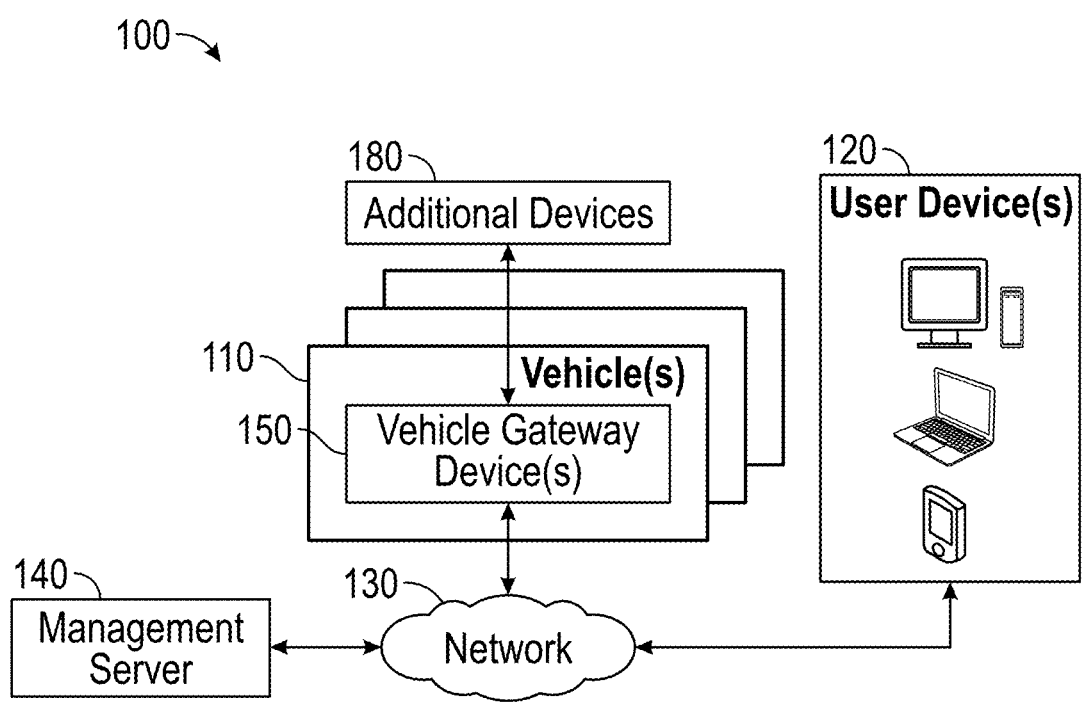
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. OVERVIEW

As mentioned above, fleet managers can make decisions and improvements by comparing their fleet to benchmarks of other fleets. Moreover, comparisons can be more meaningful if a fleet is compared to a cohort, where the fleets in a cohort share common attributes that are correlated with comparison metrics. Attributes, such as industry or fleet size, can be used to determine cohorts. However, selecting the proper attributes to determine cohorts that result in meaningful comparisons can be counterintuitive.

For example, it may be intuitive to use industry or fleet size to compare fleets. Specifically, it may be intuitive to compare a first fleet in the food/beverage industry of approximately fifty vehicles to a second fleet in the food/beverage industry of approximately fifty vehicles. But if the first fleet primarily travels on the interstate and the second fleet primarily travels in a city, comparison of safety metrics between the two fleets may not make sense since each respective fleet may have radically different safety metrics that would be misleading to compare. Thus, systems or methods that can select attributes and cohorts, which may be unintuitive, for meaningful comparisons can be improvements over intuitive attributes and cohorts for comparison purposes.

A vehicle gateway device or other device is attached to each vehicle from multiple vehicle fleets. The device gathers data related to operation of the vehicle, in addition to location data and other data related to the vehicle. The vehicle data is used to determine metrics such as harsh acceleration events, harsh braking events, crashes, and vehicle speeds. A management server receives the data from the devices for many vehicles and over extended periods of time, and aggregates and analyzes the received data in various ways.

In particular, the management server uses the vehicle metrics to group fleets into cohorts for comparison purposes. The management server can determine initial segmentation attributes. Example segmentation attributes can include fleet size, type of vehicle (e.g., passenger or heavy duty), trip length (e.g., short, medium, or long), vehicle usage (e.g., light, moderate, or heavy), and/or road usage (e.g., local or interstate). The initial segmentation attributes are then further refined, such as by removing one or more attributes that are highly correlated with another attribute and/or that are not that predictive. The refined attributes, which also can be referred to as a subset of attributes, can be determined at least in part by the management server by using machine learning techniques. The management server then determines clusters based on the refined attributes using a clustering algorithm, such as the unsupervised clustering algorithm, k-means. The resulting clusters are used to determine the cohorts of fleets. The management server determines metrics for the cohorts, which can be referred to as benchmarks, and metrics for individual fleets. The benchmarks (such as harsh brake events per 1,000 miles driven for a cohort, harsh acceleration events per 1,000 miles driven for a cohort, speeding as a percent of trip duration time, etc.) for a cohort and metrics for a fleet are presented in a graphical user interface.

A manager or analyst at an organization can review the metrics and benchmarks and make decisions. For example, in the case of safety metrics, if an analyst sees that the metrics for their fleet are worse or are trending worse than the benchmarks for their cohort, then the analyst can recommend certain corrective actions. Conversely, if an analyst sees that the metrics for their fleet are better or are trending better than the benchmarks for their cohort, then the analyst can receive some helpful feedback that their current actions are having a positive effect on the fleet's performance.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. TERMS

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle® databases, PostgreSQL® databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Vehicle Metric Data: Any data that can describe an aspect of a vehicle or something related to a vehicle. Example vehicle metric data can include harsh and/or safety-related events (such as a harsh acceleration event, a harsh braking event, or a crash event) or speed data. Additional example vehicle metric data can be related to cruise control use, coasting, accelerator pedal use, idling, battery state, anticipation, motor rotations per minute, motor power, fuel level, engine revolutions per minute (RPM), engine torque, engine load, brake use, etc. of the vehicle. Vehicle metric data does not necessarily have to be represented as a numerical value. For example, example vehicle metric data related to cruise control can indicate whether cruise control is either in an on or off state. Individual vehicle metrics can be associated with respective timestamps. As another example, a vehicle metric can be for coasting. The determination of whether the vehicle metric for coasting is either true or false can be based on a combination of vehicle parameters, such as engine torque, vehicle speed, brake pedal engagement, and/or accelerator pedal engagement. In some embodiments, some categories of vehicle metric data can come from diagnostic data that directly comes from the vehicle bus. Additional or alternatively, some vehicle metric data can be a composite of multiple vehicle parameters and/or be derived from another vehicle metric. As used herein, "vehicle metric data" and "additional devices data" can be used interchangeably.

Metric: Any data that can be used for measuring or evaluating something. In a vehicle context, metrics can be for an entire fleet. Example metrics can include, but are not limited to, harsh braking per 1,000 miles, harsh acceleration per 1,000 miles, or speeding as a percent of trip time, such as speeding 0-5, 5-10, 10-15, or greater than 15 mph over a speed limit. Metrics can be calculated from the vehicle metric data from multiple vehicles.

Cohort: Any grouping of fleets or drivers based on one or more similar attributes. Example attributes can include fleet size, vehicle composition type (e.g., passenger or heavy duty), trip length (e.g., short, medium, or long), distance driven per vehicle, vehicle usage (e.g., light, moderate, or heavy), and/or geography type (e.g., primarily local or interstate driving). Machine learning techniques can be used to determine cohorts and/or the attributes for determining cohorts.

Benchmark: Any metric for a cohort. Example metrics can include, but are not limited to, harsh braking per 1,000 miles for a cohort, harsh acceleration per 1,000 miles for a cohort, or speeding as a percent of trip time for a cohort, such as speeding 0-5, 5-10, 10-15, or greater than 15 mph over a speed limit. Benchmarks can be calculated from the vehicle metric data and/or metrics from multiple fleets. A benchmark for a cohort can be compared to a metric for a particular fleet.

III. EXAMPLE OPERATING ENVIRONMENT

FIG. 1 illustrates a block diagram of an example operating environment 100 in which one or more aspects of the present disclosure may operate, according to various embodiments of the present disclosure. The operating environment 100 may include one or more user devices 120, a management server 140, one or more vehicles 110, one or more vehicle gateway devices 150, and one or more additional devices 180. The various devices may communicate with one another via a communications network 130, as illustrated.

In general, the vehicle gateway device 150 comprises a housing including processor(s), memory, input/output ports, etc. that may be connected to components of a vehicle. For example, the vehicle gateway device 150 can interface with a vehicle bus of the vehicle 110. In particular, the vehicle gateway device 150 can connect to the vehicle bus of the vehicle 110 over an interface, such as, but not limited to, OBD-II or J1939. The vehicle gateway device 150 can receive and/or process data received via the interfaces of the vehicle gateway device 150. The vehicle gateway device 150 can include or be configured to be an electronic logging device (ELD). Accordingly, the vehicle gateway device 150 can record data regarding the operation of the vehicle 110, as well as driver activity including driver hours of service and record of duty status. Configurations of the vehicle gateway device 150 may include various analysis algorithms, program instructions, scripts, etc., as described herein. Additional details regarding the vehicle gateway device 150 are described in further detail herein, such as with respect to FIG. 3.

The vehicle gateway device 150 can store the received and/or processed data in a memory of the vehicle gateway device 150 (e.g., a computer readable storage medium). The vehicle gateway device 150 can communicate with the management server 140 over the network 130. In particular, the vehicle gateway device 150 can transmit the received and/or processed data to the management server 140. As another example, the vehicle gateway device 150 can transmit an alert to the management server 140. The management server 140 may thereby receive data from multiple vehicle gateway devices 150, and may aggregate and perform further analyses on the received data from vehicle gateway devices 150. In some embodiments, the vehicle gateway device 150 can receive updates from the management server 140.

In some embodiments, the features and services provided by the management server 140 may be implemented as web services consumable via the network 130. The management server 140 can be provided by one or more virtual machines implemented in a hosted computing environment. The hosted computing environment can include one or more rapidly provisioned and released computing resources. The computing resources can include computing, networking, and/or storage devices.

The additional device(s) 180 may include various devices for monitoring a vehicle and/or vehicle-related activity. The additional device(s) 180 can be optional and some configurations of the environment 100 do not include any additional device(s) 180. Example additional device(s) 180 can include, but are not limited to, cameras (such as network-connected dash cams) and/or sensors. Example sensors can include, but are not limited to, an accelerometer. Various example user devices 120 are shown in FIG. 1, including a desktop computer, laptop, and a smartphone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140) via the user device(s) 120. Such interactions may typically be accomplished via interactive graphical user interfaces; however, alternatively such interactions may be accomplished via command line and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the vehicle gateway devices 150 may communicate the additional device(s) 180, the management server 140, and/or the user device(s) 120 via any combination of the network 130 or any other wired or wireless communications means or method (e.g., Bluetooth®, WiFi, infrared, cellular, etc.).

Further details and examples regarding the implementations, operation, and functionality, including various interactive graphical user interfaces, of the various components of the example operating environment 100 are described herein in reference to various figures.

IV. EXAMPLE MANAGEMENT DEVICE/SERVER

Figure 2:
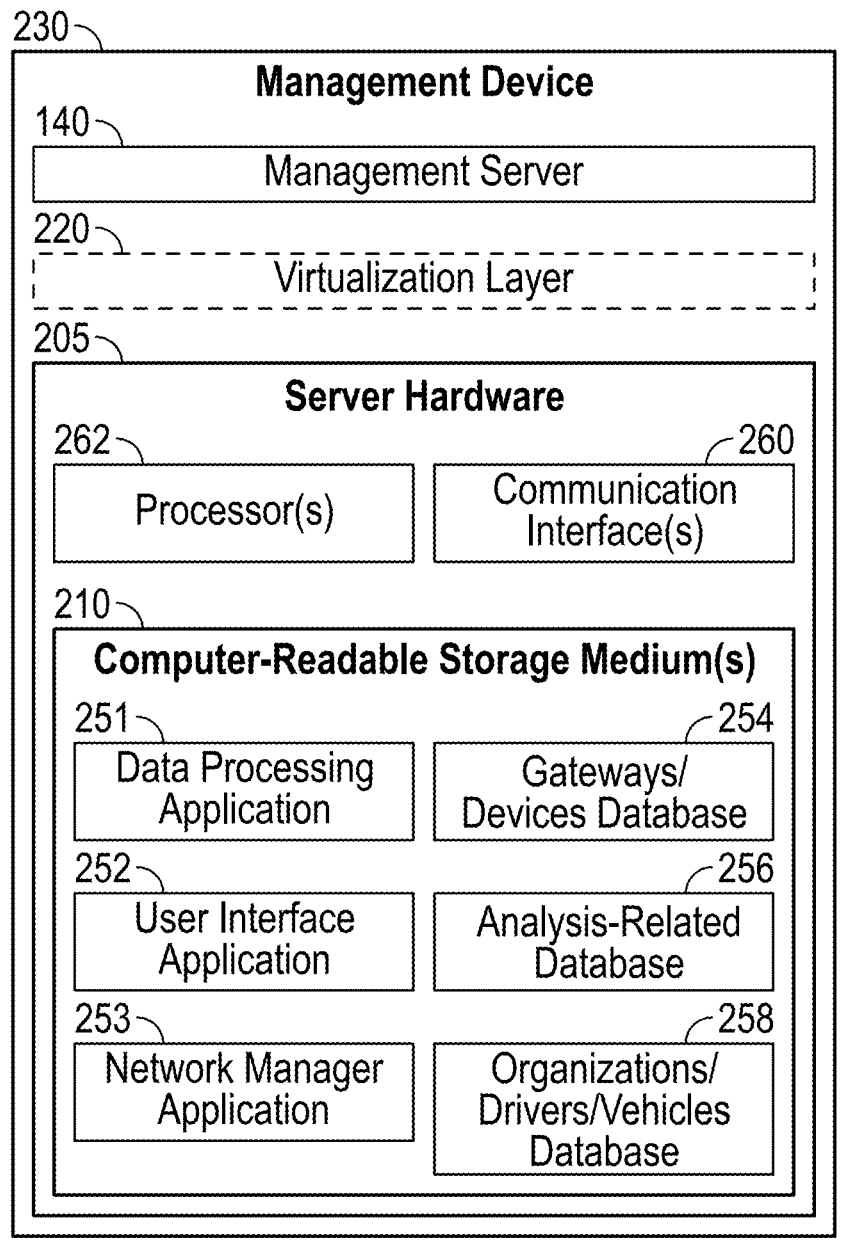
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, the management device 230 includes the management server 140. The management server 140 can be a Web or cloud server and/or a cluster of servers, running on one or more sets of server hardware. In some embodiments, the management server 140 works for both single and multi-tenant installations, meaning that multiple organizations with different administrators may have, e.g., multiple gateway devices and additional devices managed by the same management server.

According to various embodiments, the management server 140 may be implemented on the management device 230 (or multiple devices similar to the management device 230), which includes server hardware 205. The server hardware 205 can include one or more communication interfaces 260, one or more processors 262, and one or more computer readable storage mediums 210, each of which may be in communication with one another. The computer readable storage medium 210 can includes a data processing application 251, a user interface application 252, a network manager application 253, gateways/devices database 254, vehicle-related database (not shown), analysis-related database 256, and organizations/drivers/vehicles database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface application 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the vehicle gateway device 150, the additional device(s) 180, and/or the user device(s) 120 via any combination of the network 130 or any other communications means or method (e.g., Bluetooth®, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt™ transceiver, an infrared transceiver, a wireless cellular telephony transceiver (e.g., 2G, 3G, 4G, 5G), or the like.

In operation, the data processing application 251 can process and analyze data (e.g., data received from the various devices, including the gateway devices and/or additional devices) as described herein. The data processing/analysis may usefully provide insights and information that may be provided via various interactive graphical user interfaces, as described herein.

In operation, the user interface application 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface application 252 may provide various network accessible interactive graphical user interfaces, e.g., to allow the administrators of the various organizations and devices to create and log into an account associated with an organization to which a set of devices belong (e.g., gateway devices and additional devices), and manage, and access data associated with, those devices as described herein. As another example, the user interface application 252 may provide various network accessible interactive graphical user interfaces, e.g., to allow the analysts of the various organizations and devices to conduct operations analysis and/or operations configurations, as described herein.

In operation, the network manager application 253 may provide communication with and configuration and management of the various devices associated with each organization. This may include, for example, receiving and managing information related to the various devices (e.g., gateway devices and additional devices) at the time of manufacture, associating devices with particular organizations when they are purchased/claimed and implemented by the organizations (e.g., the claiming may be performed at least in part by populating the gateways/devices database 254 and the organizations/drivers/vehicles database 258 with appropriate information when the devices are associated with an organization), receiving data from the various devices (e.g., and storing the data in the gateways/devices database 254 or other appropriate database), sending data to various devices, and/or the like.

In operation, the gateways/devices database 254 can store information regarding the vehicle gateway devices 150 and/or the additional devices 180, and various relationships and associations among these devices. For example, the gateways/devices database 254 can store identifiers associated with these devices.

In operation, the analysis-related database 256 can store data (such as raw data, aggregated data, and/or analysis data) received from the vehicle gateway devices 150 and/or the additional devices 180. The analysis-related database 256 can further store processed data that is generated by the management server 140 for analysis purposes. The analysis data can include safety measurements, correlations among vehicle metrics and safety measurements, safety scores, vehicle fuel/energy efficiencies, correlations among vehicle metrics and fuel/energy efficiencies, fuel/energy efficiency scores, comparisons, trends, other correlations, recommendations, and/or route optimizations.

In operation, the organizations/drivers/vehicles database 258 can store information regarding the organizations (such as fleets) to which the vehicle gateway devices 150 and/or additional devices 180 belong. The organizations/drivers/vehicles database 258 can store data regarding the drivers and/or vehicles associated with the organization.

In various embodiments, the management server 140, as implemented by the management device 230, may include various other applications, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security application used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the applications and/or databases stored on the computer readable storage medium 210.

For example, in an implementation the management device 230 (or one or more aspects of the management device 230, e.g., the management server 140) may comprise, or be implemented in, a "virtual computing environment." As used herein, the terms "virtual computing environment", "virtualization", "virtual machine", and/or the like should be construed broadly to include, for example, computer readable program instructions executed by one or more processors (e.g., as described below) to implement one or more aspects of the applications and/or functionality described herein. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or applications of the system on different computing devices or processors, which may increase the scalability of the system. Implementing one or more aspects of the management device 230 as a virtual computing environment may further advantageously enable sandboxing various aspects, data, or applications of the system from one another, which may increase security of the system by preventing, e.g., malicious intrusion into the system from spreading. Implementing one or more aspects of the management device 230 as a virtual computing environment may further advantageously enable parallel execution of various aspects or applications of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. EXAMPLE VEHICLE GATEWAY DEVICE

Figure 3:
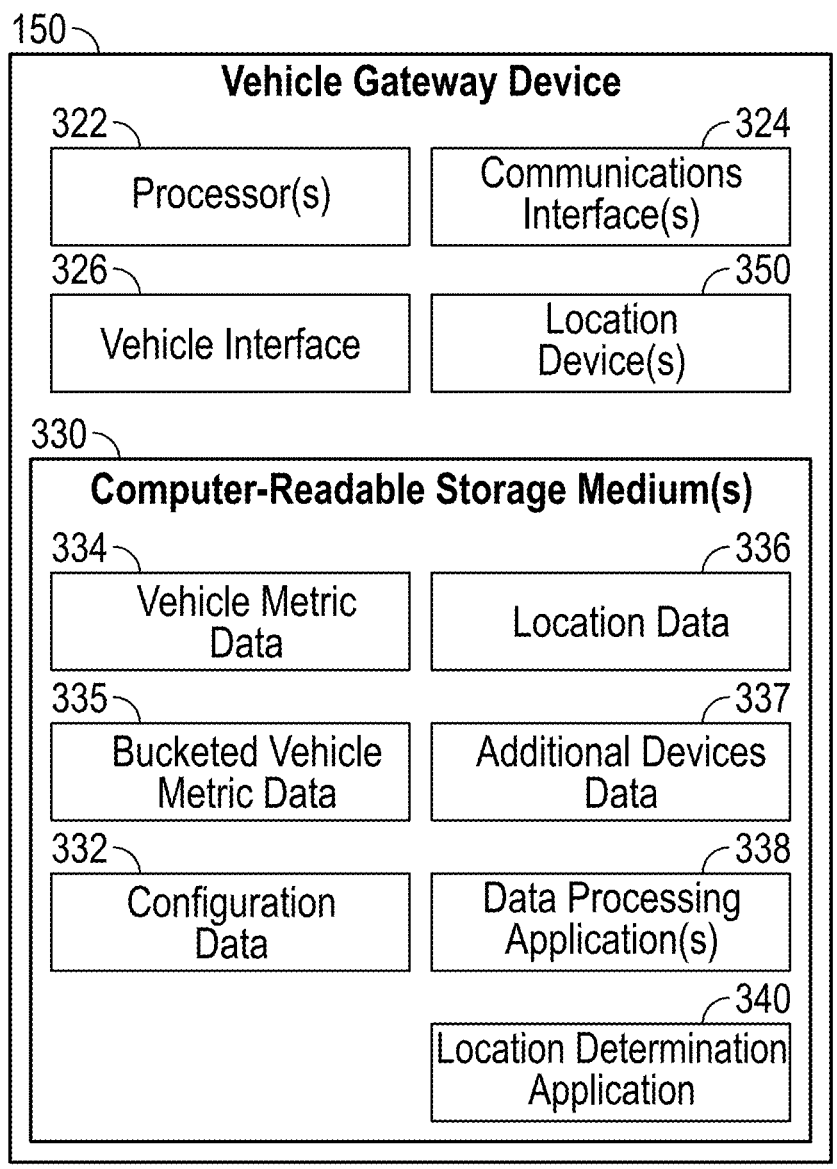
FIG. 3 illustrates a block diagram of an example vehicle gateway device, according to various embodiments of the present disclosure.

FIG. 3 illustrates a block diagram of an example vehicle gateway device 150, according to various embodiments of the present disclosure. The vehicle gateway device 150 can include one or more processors 322, one or more communication interfaces 324, one or more vehicle interfaces 326, location device(s) 350, and one or more computer readable storage mediums 330, each of which may be in communication with one another. The computer readable storage medium(s) 330 can include configuration data 332, vehicle metric data 334, bucketed vehicle metric data 335, location data 336, additional devices data 337, data processing application(s) 338, and a location determination application 340. The configuration data 332, vehicle metric data 334, bucketed vehicle metric data 335, location data 336, additional devices data 337 can be stored in one or more databases of the vehicle gateway device 150. In various implementations one or more buses, interconnects, wires/cables, etc. may be used to interconnect the various components of the vehicle gateway device 150, and of the vehicle gateway device 150 more generally.

In operation, the one or more communication interfaces 324, one or more processors 322, and one or more computer readable storage mediums 330 communicate with one another to, e.g., execute by the processor(s) 322 computer program instructions (e.g., from the data processing application(s) 338); receive, access, and transmit data (e.g., via the communication interface(s) 324); and/or the like. Example processor(s) 322 can include various types of processors, such as, but not limited to, general purposes processors, e.g., a microprocessor, and/or special purposes processors, e.g., Graphics Processing Units ("GPUs"), Application Specific Integrated Circuits ("ASICs"), Field-Programmable Gate Arrays ("FPGAs"). Further implementation details are described below.

The communication interface(s) 324 can enable wired and/or wireless communications with other devices and networks, as described herein. For example, the vehicle gateway device 150 can communicate with the additional device(s) 180, the management server 140, and/or the user device(s) 120 via any combination of the network 130 or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth® or Bluetooth® Low Energy (LE) transceiver, an IEEE 802.11 transceiver, an Ethernet transceiver, a USB transceiver, a Thunderbolt™ transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces (APIs).

The vehicle interface 326 can communicate with a vehicle bus. As described herein, the vehicle bus is an internal communications network that connects components, such as a car's electronic controllers, within a vehicle. Example protocols that the vehicle interface 326 can communicate with can include, but are not limited to, Controller Area Network (CAN), Local Interconnect Network (LIN), OBD-II or OBD2, and/or J1939. Accordingly, the vehicle interface 326 can allow access to the vehicle's electronic controllers. The vehicle gateway device 150, via the vehicle interface 326, can access vehicle diagnostics, such as fuel level, engine revolutions per minute (RPM), speed, engine torque, engine load, brake use, etc. In some embodiments, the vehicle gateway device 150, via the vehicle interface 326, can receive messages from the vehicle bus from the car's electronic controllers related to vehicle data, such as fuel level, engine revolutions per minute (RPM), speed, engine torque, engine load, brake use, etc. Additionally or alternatively, the vehicle gateway device 150, via the vehicle interface 326, can query the car's electronic controllers to receive vehicle data, such as fuel level, engine revolutions per minute (RPM), speed, engine torque, engine load, brake use, etc.

The location determination application 340 can use the location device(s) 350. Example location device(s) 350 can include a global positioning system (GPS) device or a global navigation satellite system (GLONASS) device. Data received from the location device(s) 350 can be stored as location data 336 in the computer readable storage medium(s) 330. In some embodiments, the location determination application 340 can determine the location of the vehicle gateway device 150 using various geolocation methods that use, but are not limited to, Wi-Fi, Bluetooth, Internet Protocol (IP), and/or proximity to beacons. The location determination application 340 may determine the location of the gateway device 110 and generate location data 336 associated with the location of the gateway device 110. The location data 336 may include geographical positioning information (e.g., GPS coordinates or latitudinal and longitudinal coordinates) that may represent the location of the vehicle gateway device 150. Additionally or alternatively, the location information may identify an area within a grid (such as a map tile) that identifies and/or estimates the location of the vehicle gateway device 150.

In operation, the vehicle metric data 334 can include raw vehicle data received from the vehicle bus and/or the various additional devices 180 via the vehicle interface 326, communications interface(s) 324, and/or input ports of the vehicle gateway device 150. In operation, the bucketed vehicle metric data 334 can include aggregated metric data. In some embodiments, the data processing application 338 can bucket the raw vehicle data as aggregated data and can store the aggregated results as the bucketed vehicle metric data 334.

In operation, the additional devices data 337 can include data received from the various additional devices 180 via the vehicle interface 326, communications interface(s) 324, and/or input ports of the vehicle gateway device 150. Example additional devices data 337 can include, but is not limited to, accelerometer data, camera data, and/or video data.

In operation, the configuration data 332 can include one or more configurations that configure operation of the vehicle gateway device 150. For example, such configurations may be received from a user and/or the management device 230 (and/or other devices in communication with the vehicle gateway device 150), and may include various communications specifications (e.g., that indicate functionality of the input and output ports), executable program instructions/code, algorithms or processes for processing the received data, and/or the like. The vehicle gateway device 150 may store multiple configurations in the configuration data 332, which may be selectively run or implemented, e.g., via user selection via the management server 140 and/or the user device(s) 120.

In operation, the data processing application(s) 338 can process and analyze received data. The processing and analysis by the data processing application(s) 338 may result in one or more outputs from the vehicle gateway device 150 that may be provided via the communications interface(s) 324, as further described herein. In various implementations, the data processing application(s) 338 may be executed by the processor(s) 322.

In various embodiments, firmware of the vehicle gateway device 150 may be updated such that the vehicle gateway device 150 may provide additional functionality. Such firmware updating may be accomplished, e.g., via communications with the management server 140, thereby enabling updating of multiple vehicle gateway devices 150 remotely and centrally. Additional functionality may include, for example, additional communications specifications, additional ways of communicating with additional devices 180 (e.g., additional control languages, etc.), additional configurations or options for configurations, and/or the like.

VI. EXAMPLE METHODS AND FUNCTIONALITY FOR DATA AGGREGATION

Figure 4A:
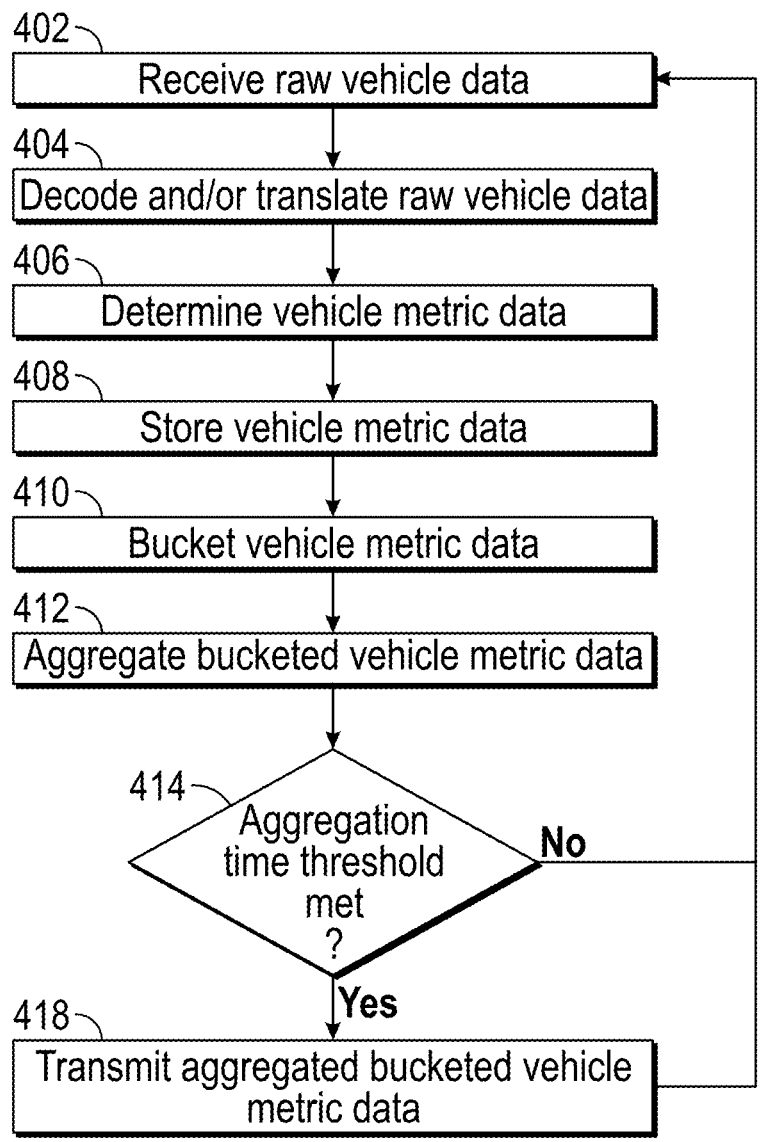
FIGS. 4A-4B are flowcharts illustrating example methods and functionality related to data aggregation on a vehicle gateway device, according to various embodiments of the present disclosure.
Figure 4B:
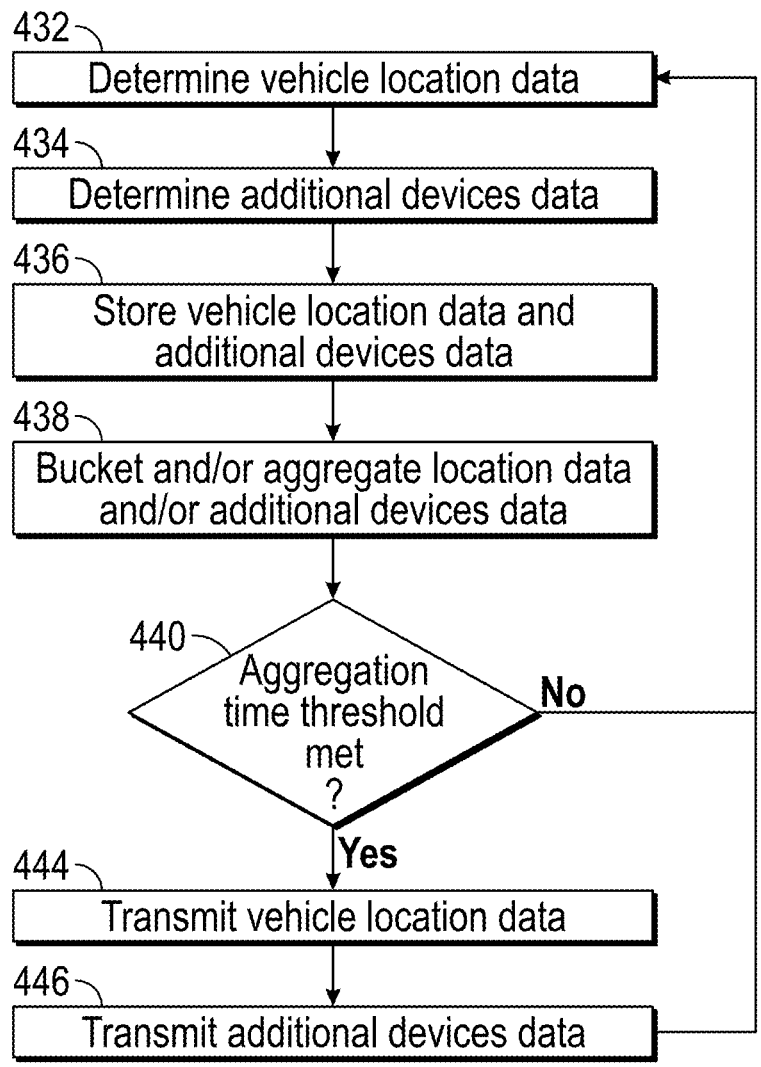

FIGS. 4A-4B are flowcharts illustrating example methods and functionality related to data aggregation on a vehicle gateway device 150, according to various embodiments of the present disclosure.

Turning to FIG. 4A, beginning at block 402, raw vehicle data can be received. In particular, the vehicle gateway device 150 can receive the raw vehicle data. The vehicle gateway device 150 can receive the raw vehicle data via the vehicle interface 326 with a vehicle 110. The vehicle gateway device 150 can communicate with electronic controllers of the vehicle 110 and/or the vehicle's computer over the vehicle interface 326 and the vehicle bus. The communication between the vehicle gateway device 150 and the vehicle 110 can use a particular communication protocol, such as OBD-II or J1939. In some embodiments, the vehicle gateway device 150 can record broadcasted data over the vehicle bus, thereby receiving the raw vehicle data. Additionally or alternatively, the vehicle gateway device 150 can request raw vehicle data over the vehicle bus. The raw vehicle data can be received over a period of time. As described herein, example raw vehicle data can include any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle 110.

In some embodiments, the vehicle gateway device 150 can receive vehicle battery data associated with a battery from the vehicle 110. The vehicle battery data can represent a state of the vehicle battery. The vehicle battery data can be for an electric vehicle, a hybrid vehicle (such as a plug-in hybrid electric vehicle), or internal combustion engine (ICE) vehicles. The vehicle gateway device 150 can listen for battery-related messages from a battery management system (BMS) of the vehicle 110. Additionally or alternatively, the vehicle gateway device 150 can request vehicle battery data from the battery management system.

At block 404, the raw vehicle data can be decoded and/or translated. In particular, the vehicle gateway device 150 can decode and/or translate the raw vehicle data. The raw vehicle data can be in a particular data format, such as an OBD-II or J1939 data format. Accordingly, the vehicle gateway device 150 can decode and/or translate the raw vehicle data in the particular data format. The vehicle gateway device 150 can decode and/or translate the raw vehicle data based at least in part on rules specifically related to the vehicle. For example, the vehicle gateway device 150 can include rules for decoding particular data formats, such as OBD-II or J1939. The vehicle gateway device 150 can use different sets of rules for decoding and/or translating data from a particular vehicle depending on the communication protocol that the particular vehicle uses. Additionally or alternatively, the vehicle gateway device 150 can store the raw vehicle data in its original data format.

At block 406, vehicle metric data can be determined. In particular, the vehicle gateway device 150 can determine vehicle metric data from the raw vehicle data. For example, the raw vehicle data regarding cruise control use, coasting, accelerator pedal use, idling, battery state, anticipation, motor rotations per minute, motor power, fuel level, engine revolutions per minute (RPM), speed, engine torque, engine load, brake use, etc. can be voluminous. The vehicle gateway device 150 can parse and organize the raw vehicle data into individual vehicle metrics. For example, a value and/or on/off state can be determined for each of cruise control use, coasting, accelerator pedal use, idling, battery state, anticipation, motor rotations per minute, motor power, fuel level, engine revolutions per minute (RPM), speed, engine torque, engine load, brake use, etc. over the period of time. Moreover, some example vehicle metrics can be based on a combination of vehicle parameters. For example, a vehicle metric can be for coasting. The vehicle gateway device 150 can determine the vehicle metric for coasting to be either true or false based on a combination of vehicle parameters, such as engine torque, vehicle speed, brake pedal engagement, and/or accelerator pedal engagement. In particular, the vehicle gateway device 150 can determine the vehicle metric for coasting to be true when each of the following are determined to be true: engine torque is zero, vehicle speed is greater than zero, brake pedal is not engaged, and accelerator pedal is not engaged.

Another example of determined vehicle metric can be for accelerator pedal engagement. In some embodiments, accelerator pedal data from the vehicle bus may be unreliable. Accordingly, the vehicle gateway device 150 can determine the vehicle metric for accelerator pedal engagement based on at least one of engine torque or engine load. For example, the vehicle gateway device 150 can determine the vehicle metric for accelerator pedal engagement as a percentage based value ranges for engine torque and/or engine load.

Yet another example of determined vehicle metric can be for anticipation. Anticipation can generally refer to driver behavior with respect to anticipating having to brake. For example, those drivers that anticipate traffic in their driving will typically not have to brake as hard. The vehicle metric for anticipation can be a categorizations of brake events, such as, any brake event and/or a quick brake event. The vehicle gateway device 150 can determine the brake event category based on a combination of vehicle parameters, such as brake pedal engagement, accelerator pedal engagement, engine torque, and/or engine load. In particular, the vehicle gateway device 150 can determine the vehicle metric for a quick brake event when each of the following are determined: the accelerator pedal is disengaged and the brake pedal is subsequently engaged in approximately less than one second. Any brake event can include any time the driver presses the brake pedal.

At block 408, the vehicle metric data can be stored. In particular, the vehicle gateway device 150 can store the vehicle metric data in the computer-readable storage medium(s) 330. For example, the vehicle gateway device 150 can store the vehicle metric data in a database on the computer-readable storage medium(s) 330. As described herein, aggregated bucketed vehicle metric data may be generated by the vehicle gateway device 150 and transmitted to the management server 140. However, in some environments, the management server 140 may query the vehicle gateway device 150 for particular vehicle metric data, which can be retrieved from the computer-readable storage medium(s) 330.

At block 410, the vehicle metric data can be bucketed. In particular, the vehicle gateway device 150 can determine corresponding vehicle metric buckets for each of the vehicle metrics. In some embodiments, there can be a single bucket for a particular metric. One example category of buckets is an engine revolutions per minute (RPM) category. Example buckets for RPM can include RPM bands with RPM ranges for each band. Example buckets for speed can include buckets for every 5 or 10 mph. Additionally or alternatively, the management server 140 may receive the raw speed data and may calculate speed metrics from the raw speed data. Many of the vehicle metrics described herein can be used to compare fuel/energy efficient driving among cohorts.

For example, the RPM band buckets can include a first bucket for an RPM band of approximately 800-1700 RPM and a second bucket for an RPM band starting from a low of approximately 700-900 RPM to a high of approximately 1600-1800 RPM. In some embodiments and vehicles, the RPM band of approximately 800-1700 RPM can be an efficient range for operating a vehicle with respect to fuel/energy use and the RPM bands starting from a low of approximately 700-900 RPM to a high of approximately 1600-1800 RPM can be inefficient ranges for operation of the vehicle with respect to fuel/energy use. The bucket of 800-1700 RPM can be considered a "green" RPM range. Conversely, the other bucket can be considered a "red" RPM range(s). If the vehicle metric data includes RPM values of 798, 799, and 800 for each millisecond, respectively, then the 800 RPM value can be placed in the efficient RPM bucket and the 798 and 799 RPM values can be placed in the inefficient bucket. In some embodiments, the particular buckets can be customized for types of vehicles. For example, different types of vehicles can have different recommended RPM ranges for fuel/energy efficiency. The "green band" RPM range for different vehicle may vary by plus or minus 50 to 100 RPM depending on the particular vehicle or type of vehicle.

Another example category of buckets is a cruise control category. Example buckets for cruise control can include a cruise control on bucket and a cruise control off bucket. For example, if the vehicle metric data includes instances of cruise control being on for timestamps 1 and 2 and cruise control being off for timestamp 3, then the first two instances can be placed in the cruise control on bucket and the remaining instance can be placed in the cruise control off bucket.

Yet another example category of buckets is a coasting category. Example buckets for coasting can include a coasting true bucket and a coasting false bucket. For example, if the vehicle metric data includes instances of coasting being true for timestamps 1 and 2 and coasting being false for timestamp 3, then the first two instances can be placed in the coasting true bucket and the remaining instance can be placed in the coasting false bucket. As described herein, the determination of whether coasting is true or false at a particular timestamp can be based on a number of vehicle parameters, such as engine torque, vehicle speed, brake pedal engagement, and/or accelerator pedal engagement.

Similar to the previous bucket examples, the following bucket examples can characterize the state of a vehicle over a period of time at respective timestamps of the vehicle. Yet another example category of buckets is an accelerator pedal engagement category. Example buckets for accelerator pedal engagement can include a first bucket for accelerator pedal engagement over approximately 95 percent, and a second bucket for accelerator pedal engagement less than or equal to approximately 95 percent. Yet another example category of buckets is for idling. Example buckets for idling can include a first bucket for idling true, and a second bucket for idling false. Yet another example category of buckets is for anticipation. Example buckets for idling can include a first bucket for any brake event, and a second bucket for a quick brake event.

Another example bucket is a bucket for a particular vehicle battery charge. For example, in the context of an electric vehicle or a plug-in hybrid electric vehicle, the vehicle gateway device 150 can determine that vehicle battery data is associated with a particular instance of a vehicle battery charge.

At block 412, the vehicle metric data can be aggregated. In particular, the vehicle gateway device 150 can aggregate, over the period of time, the vehicle metrics into the corresponding vehicle metric buckets to generate aggregated bucketed vehicle metric data. The vehicle gateway device 150 can represent the aggregations differently based on the embodiment or in multiple ways. For example, the vehicle gateway device 150 can aggregate a cumulative time spent in each bucket. In the case of RPM buckets, the vehicle gateway device 150 can aggregate a cumulative time spent in each bucket (e.g., 1 minute and 10 seconds in the "green" bucket and 2 minutes and 15 seconds in the "red" bucket). Additional example aggregations can include: time spent with cruise control on and time spent with cruise control off; time spent coasting as true and time spent coasting as false; time spent with the accelerator pedal engagement over approximately 95 percent and time spent with the accelerator pedal engagement less than or equal to approximately 95 percent; and/or time spent idling as true and time spent idling as false. Additionally or alternatively, the vehicle gateway device 150 can represent the time spent in each bucket as a percentage. In some embodiments, the vehicle gateway device 150 can store the bucketed vehicle metric data and/or the aggregated bucketed vehicle metric data in the computer-readable stored medium(s) 330 of the vehicle gateway device 150.

In some embodiments, the vehicle gateway device 150 can aggregate, over the period of time, quantities. For example, if each bucket has discrete items (such as events), the vehicle gateway device 150 can aggregate the discrete items in each bucket. In the case of anticipation buckets, the vehicle gateway device 150 can aggregate the total number of any type of brake event in a first bucket and the total number of quick brake events in the second bucket. For example, the vehicle gateway device 150 can aggregate the first bucket to have a total of 15 of any type of brake events and the second bucket to have a total of 5 of quick brake events. Additionally or alternatively, the vehicle gateway device 150 can represent each aggregated bucket total as a percentage.

In some embodiments, the vehicle gateway device 150 can aggregate bucket(s) for a vehicle battery charge by determining charge record(s) from the vehicle battery data. An example charge record can include (i) data indicative of an amount of energy charged relative to a capacity of the battery (such as a percentage of the battery charged for a particular charge instance) and (ii) an amount of energy charged relative to a period of time (such as a charge amount in a unit of energy like kilowatt-hour (kWh)). Another example charge record can include (i) a start state of charge, (ii) an end state of charge, and (iii) an amount of energy charged. As described herein, the vehicle gateway device 150 can transmit historical vehicle battery data to the management server 140 and the management server 140 can determine charge record(s) from the historical vehicle battery data. Depending on the embodiment, the historical vehicle battery data can include charge record(s) or the historical vehicle battery data can include the underlying data with which the management server 140 can calculate the charge record(s).

At block 414, it can be determined whether the aggregation time threshold has been met. In particular, the vehicle gateway device 150 can determine whether the aggregation time threshold has been met. Example aggregation time thresholds can include 1 minute, 2 minutes, 5 minutes, etc. The vehicle gateway device 150 can maintain a running timer to determine whether the aggregation time threshold has been met. Additionally or alternatively, the vehicle gateway device 150 can maintain a last expiration time variable and can determine a difference between the last expiration time with a current time. When the difference between the last expiration time and the current time is greater than or equal to the aggregation time threshold, the vehicle gateway device 150 can determine that the aggregation time threshold has been met. If it has been determined that the aggregation time threshold has been met, the method can proceed to block 418 for transmitting the aggregated data. Otherwise, the method can return to block 402 to receive more vehicle data and operate in a loop until the aggregation time threshold has been met.

In some embodiments, there can be different time thresholds for different vehicle metrics. For example, metrics regarding RPM and fuel level can be provided to the management server 140 more regularly, such as every five minutes. As another example, the vehicle battery data and/or the battery charge record(s) can be provided once or twice a day from the vehicle gateway device 150 to the management server 140.

In some embodiments (while not illustrated), while the block 412 for aggregating bucketed vehicle metric data appears before the block 414 for determining whether the aggregation time threshold has been met, the reverse can occur. Specifically, the block 412 for aggregating bucketed vehicle metric data can occur after the block 414 that determines whether the aggregation time threshold has been met. For example, if the aggregation time threshold has been met (such as five minutes), the vehicle gateway device 150 can then aggregate the bucketed data and then proceed to block 418 for transmitting the aggregated data.

At block 418, the aggregated bucketed vehicle metric data can be transmitted. In particular, in response to determining that an aggregation time threshold is met, the vehicle gateway device 150 can transmit, to a receiving server system (such as the management server 140), the aggregated bucketed vehicle metric data. For example, the vehicle gateway device 150 can transmit any of the aggregated bucketed data relating to cruise control use, coasting, accelerator pedal use, idling, battery state, anticipation, motor rotations per minute, motor power, fuel level, engine revolutions per minute (RPM), speed, engine torque, engine load, brake use, etc. In particular, the vehicle gateway device 150 can transmit charge records to a computing device such as the management server 140. In some embodiments, if the vehicle gateway device 150 loses network connection, the vehicle gateway device 150 can queue aggregated vehicle data until it obtains the network connection again. As shown, after the data has been transmitted, the method can return to block 402 to receive more data and perform in a loop until the aggregation time threshold is met again.

Accordingly, the vehicle gateway device 150 can advantageously transmit vehicle data in an efficient manner. Example advantages (not all of which may be applicable in every embodiment) can include the following. For example, instead of the vehicle gateway device 150 transmitting vehicle data with a higher frequency (such as every millisecond), the vehicle gateway device 150 can transmit the vehicle data with a lower frequency. This can result in lower bandwidth usage. As another example, instead of transmitting vehicle individual data items (such as cruise control use, RPM, speed, engine torque, engine load, brake use, etc. for every millisecond), the vehicle gateway device 150 transmits aggregated vehicle data. Accordingly, the aggregated vehicle data can have a smaller data size than the total data size of the individual data items. In other words, the aggregated vehicle data can be a compressed, summary data representation of the raw vehicle data. This can be advantageous because the compressed vehicle data can use less network bandwidth and/or can be transmitted to the destination server faster in contrast to the individual data items that would use more network bandwidth and/or would be transmitted slower.

Turning to FIG. 4B, beginning at block 432, vehicle location data can be determined. In particular, the vehicle gateway device 150 can determine the vehicle location data. For example, the vehicle gateway device 150 can receive location data from the location device(s), such as GPS or GLONASS receivers. The location data can be associated with timestamps. Accordingly, the vehicle gateway device 150 can determine geolocation data associated with the vehicle 110, which can include time data.

At block 434, data from the additional device(s) can be determined. In particular, the vehicle gateway device 150 can receive data from the additional device(s). For example, the vehicle gateway device 150 can receive accelerometer data, camera data, and/or sensors data. Similar to the vehicle location data that can be associated with timestamps, the additional devices data can be associated with timestamps. At block 436, the vehicle location data and/or the additional devices data can be stored. In particular, the vehicle gateway device 150 can store the vehicle location data and/or the additional devices data in the computer-readable stored medium(s) 330 of the vehicle gateway device 150.

At block 438, data can be aggregated and/or bucketed. In particular, the vehicle gateway device 150 can aggregate the vehicle location data and/or the additional devices data. For example, as opposed to a time series that includes pairs of time values and data values for relatively small units of time, the vehicle gateway device 150 can aggregate at least one of the vehicle location data or the additional devices data to represent that a respective data value is associated with a period time. Additionally or alternatively, the vehicle location data and/or the additional devices data can be bucketed. Block 438 for aggregating/bucketing data can be similar to blocks 410, 412 of FIG. 4A for aggregating/bucketing data. For example, similar to the bucketed vehicle metric data that was aggregated by the vehicle gateway device 150 described above with respect to FIG. 4A, the vehicle location data and/or the additional devices data can be bucketed/aggregated by the vehicle gateway device 150. For example, in the case of vehicle location data, particular locations or location areas can each have respective buckets and the vehicle gateway device 150 can determine how much time the vehicle 110 spent at each location or location area over a period of time, i.e., a cumulative time for each location bucket. For example, in the case of additional sensor data, ranges of the sensor data can each have respective buckets and the vehicle gateway device 150 can determine how much time the sensor spent within the respective sensor ranges over a period of time, i.e., a cumulative time for each sensor range bucket.

At block 440, it can be determined whether the aggregation time threshold has been met. In particular, the vehicle gateway device 150 can determine whether the aggregation time threshold has been met. Block 440 for determining whether the aggregation time threshold has been met can be similar to block 414 of FIG. 4A for determining whether the aggregation time threshold has been met. For example, the aggregation time threshold can be the same for the aggregated vehicle data, the vehicle location data, and/or the additional devices data. Also, in some embodiments, while not illustrated, the block 438 for aggregating/bucketing data can be performed after it has been determined that the aggregation time threshold has been met. If the aggregation time threshold has been met, the method can proceed to block 444. Otherwise, the method can return to block 432 to receive more vehicle location data and/or additional devices data and perform in a loop until the aggregation time threshold has been met. At blocks 444, 446, the vehicle location data and/or the additional devices data can be transmitted to a receiving server system. In particular, the vehicle gateway device 150 can transmit the vehicle location data and/or the additional devices data (which can be aggregated/bucketed) to the management server 140. As shown, after the data has been transmitted, the method can return to block 432 to receive more data and perform in a loop until the aggregation time threshold is met again.

VII. EXAMPLE METHODS AND FUNCTIONALITY FOR PROCESSING RECEIVED AND/OR AGGREGATED DATA

Figure 5:
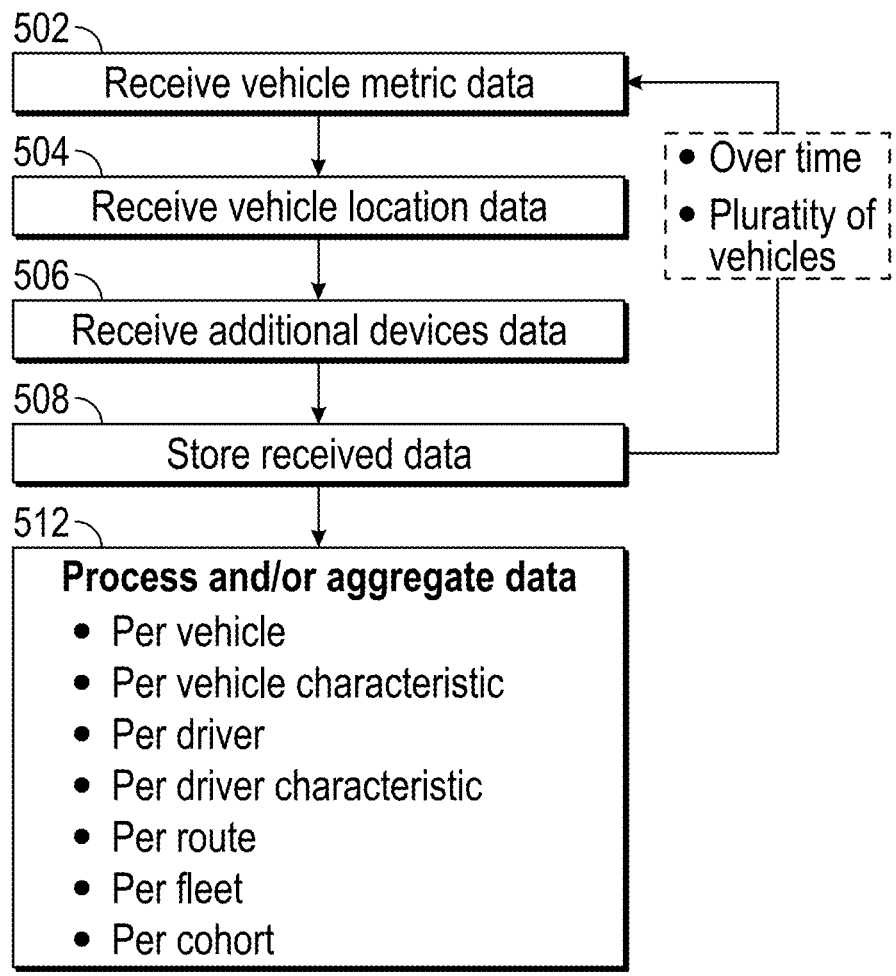
FIG. 5 is a flowchart illustrating example methods and functionality related to processing vehicle-related data and using the processed data, according to various embodiments of the present disclosure.

FIG. 5 is a flowchart illustrating example methods and functionality related to processing vehicle-related data. Beginning at blocks 502, 504, 506, data can be received. In particular, at block 502, a computing device (such as the management server 140) can receive vehicle metric data (such as the aggregated bucketed vehicle metric data) from the vehicle gateway device 150. At block 504, the computing device can receive vehicle location data from the vehicle gateway device 150. At block 506, the computing device can receive additional devices data from the vehicle gateway device 150. Other data can be received, such as data from third parties and/or data regarding fuel/energy purchasing. As described herein, the computing device (such as the management server 140) can receive the data in batches or intervals. At block 508, the received data can be stored. In particular, the management server 140 can store the received data in the computer-readable stored medium(s) 210, such as by storing the received data in the analysis-related database 256.

As depicted, the blocks 502, 504, 506, 508 for receiving and storing data can operate in a loop by returning to the first block 502. Thus, the management server 104 can receive and/or store data for multiple vehicle gateway devices and/or vehicles over time.

At block 512, the data can be processed and/or aggregated. In particular, the management server 140 can process and/or aggregate the data. As described herein, the management server 140 can receive bucketed data for a particular time window. Accordingly, the management server 140 can combine and/or take a portion of the bucketed data. For example, the management server 140 can determine a vehicle metric for a certain time period (such as one or several days) by at least combining bucketed data within the time period, where each bucket of data can correspond to a subset of the time period (such as bucketed data for every five minutes). With respect to speed data, the management server 140 can calculate buckets of speed data (every 5 or 10 mph) from the raw speed data.

The management server 140 can aggregate/filter data based on a property in common. Example common properties can include a common location, vehicle, vehicle characteristic, driver, driver characteristic, route, fleet, cohort, and/or time period. The graphical user interfaces 900, 910, 920, 930, 940 described in further detail below with respect to FIGS. 9A, 9B, 9C, 9D, and 9E, respectively, can depict data aggregated by fleet and compared to a benchmark from a cohort. For example, as shown in FIGS. 9A, 9B, 9C, 9D, and 9E, the management server 104 can aggregate safety metrics by fleet and by cohort. The management server 104 can aggregate vehicle metrics from multiple vehicle gateway devices that are each associated with the same fleet and/or cohort.

In some embodiments, the management server 104 can pre-compute some metrics. For example, as the management server 104 receives data, the management server 104 can continuously process and/or aggregate the data on a running basis. Additionally or alternatively, the management server 104 can process and/or aggregate data in response to user requests. For example, the management server 104 can process and/or aggregate metrics in response to user selections to generate any of the user interfaces described herein.

VIII. EXAMPLE ADDITIONAL DEVICE

Figure 6:
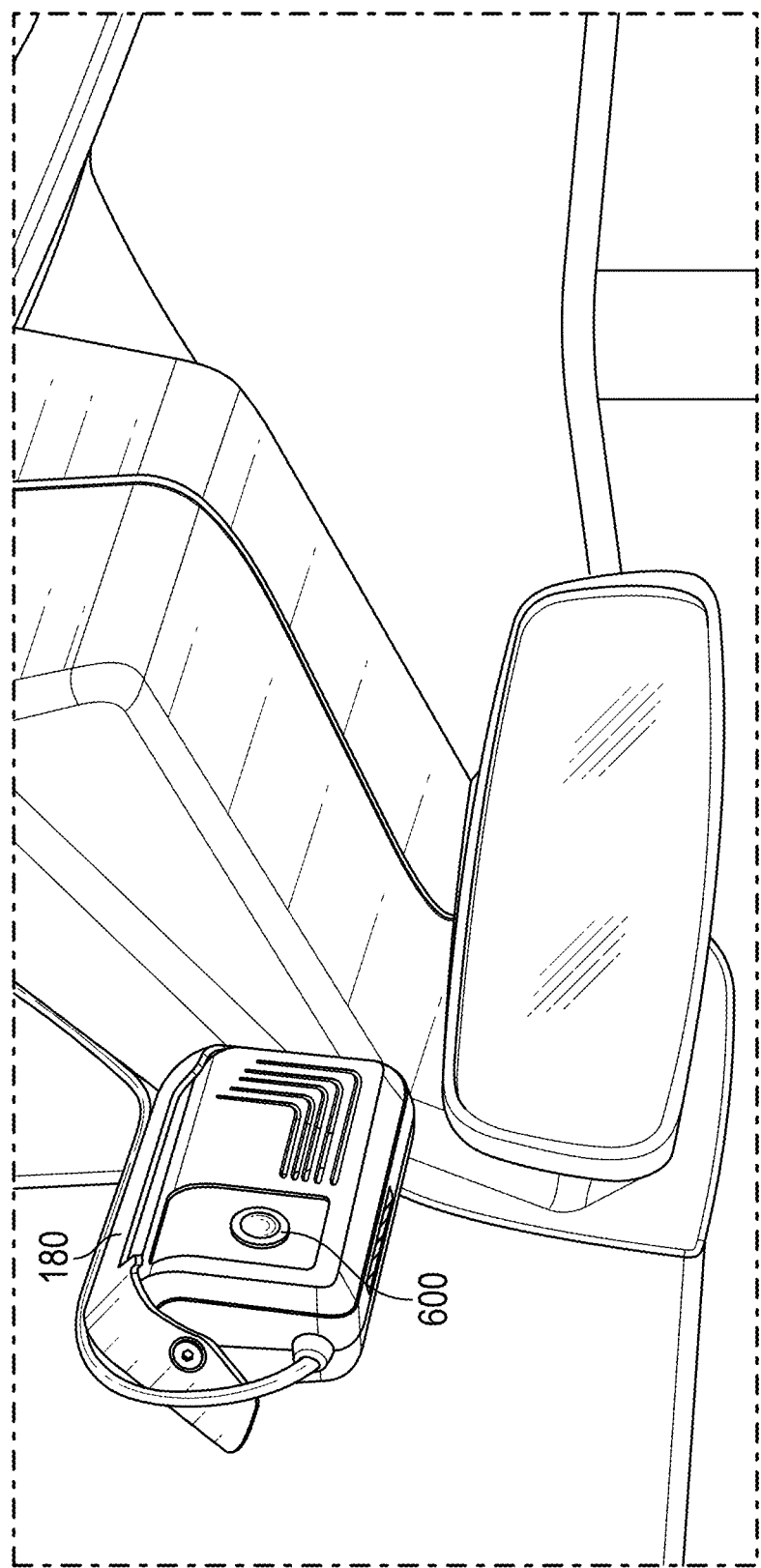
FIG. 6 illustrates an example additional device, according to various embodiments of the present disclosure.

FIG. 6 illustrates an example additional device 180 mounted inside a vehicle. The additional device 180 can include one or more processors and a computer-readable storage medium. In this example, the additional device 180 includes a driver facing camera 600 and one or more outward facing cameras (not shown). In other embodiments, the additional device 180 may include different quantities of video and/or still image cameras. The footage can be transmitted to the management server 140. In some embodiments, the additional device 180 can analyze the footage to determine safety-related events and the events can be transmitted to the management server 140. In some embodiments, one or more of the cameras may be high-definition cameras, such as with HDR and infrared LED for night recording. For example, in one embodiment the outward—facing camera includes HDR to optimize for bright and low light conditions, while the driver—facing camera includes infrared LED optimized for unlit nighttime in—vehicle video.

The additional device 180 may include, or may be in communication with, one or more accelerometers, such as accelerometers that measure acceleration (and/or related G forces) in each of multiple axes, such as in an X, Y, and Z axis. The accelerometer data can be transmitted to the management server 140. In some embodiments, the additional device 180 can analyze the accelerometer data to determine safety-related events and the events can be transmitted to the management server 140. The additional device 180 may include one or more audio output devices, such as to provide hands-free alerts and/or voice-based coaching. The additional device 180 may further include one or more microphones for capturing audio data. The additional device 180 includes one or more computer processors, such as high-capacity processors that enable concurrent neural networks for real-time artificial intelligence processing.

In some embodiments, instead of being communicating data via the vehicle gateway device 150, the additional device 180 transmits encrypted data via SSL (e.g., 256-bit, military-grade encryption) to the management server 140 via a high-speed 4G LTE network or other wireless communications network, such as a 5G network.

IX. EXAMPLE HARSH EVENT DETECTION

Figure 7:
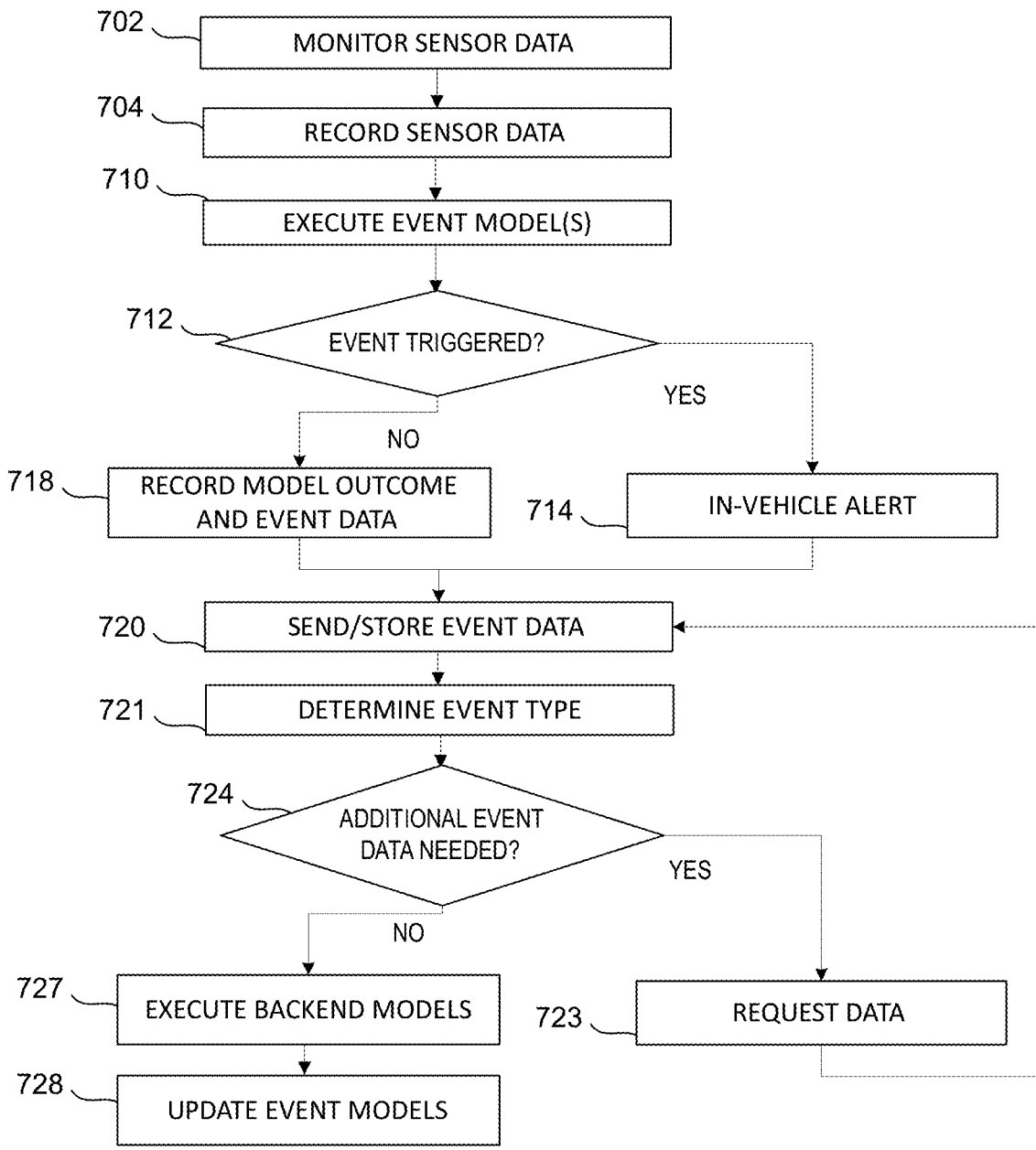
FIG. 7 is a flowchart illustrating example methods and functionality related to harsh event detection, according to various embodiments of the present disclosure.

FIG. 7 is a flowchart illustrating example methods and functionality for harsh and/or safety-related event detection. Beginning at block 702, sensor data (e.g., accelerometer data) is monitored. For example, the vehicle gateway device 150 and/or the additional device 180 can monitor sensor data. At block 704, sensor data is recorded. For example, the vehicle gateway device 150 and/or the additional device 180 can store sensor data in a data store. Accelerometer data for a particular time period (e.g., 2, 12, 24 hours, etc.) may be stored in a data store. Similarly, image data, such as video data for a particular time period may be stored in the data store.

Next, at block 710, one or more event models are executed on the sensor data. In some embodiments, the events models can be machine-learning models. The event models executed at block 710 are configured to identify safety-related events indicative of a sudden, extreme, and/or unexpected movement of the vehicle and/or driver. Example safety-related events are harsh events that can include a harsh acceleration event, a harsh braking event, or a crash event. In some embodiments, the event models are configured to trigger a harsh event based on the level of G forces sensed within the vehicle. For example, in some embodiments the additional device 180 includes accelerometers that sense acceleration in each of three dimensions, e.g., along an X, Y, and Z axis. In some embodiments, the acceleration data (e.g., in m/s2) is converted to g-force units (Gs) and the thresholds for triggering harsh events are in Gs. In some embodiments, a harsh event may be associated with a first acceleration threshold in the X axis, a second acceleration threshold in the Y axis, and/or a third acceleration threshold in the Z axis. In some implementations, a harsh crash event may be triggered with acceleration thresholds reached in at least two, or even one, axis. Similar acceleration thresholds in one or more of the X, Y, and Z axes are associated with other harsh events, such as harsh acceleration, harsh breaking, and harsh turning.

In some embodiments, the thresholds are determined by a user-configurable setting. A user-configurable setting can allow the user (e.g., an owner or manager of a fleet) to either use defaults based on vehicle type (e.g., passenger, light duty or heavy duty), or to set custom combinations of acceleration thresholds that must be met to trigger an associated safety-related event. For example, a user may set triggering thresholds for safety-related events via a user interface, which is described in further detail below with respect to FIG. 8.

In some embodiments, event models may only trigger safety-related events under certain conditions, such as one or more thresholds that are set to default levels and, in some implementations, may be customized by the user. In some embodiments, safety-related events are only triggered when the vehicle is moving faster than a floor threshold, such as greater than 5 mph, to reduce noise and false positives in triggered safety-related events. In some embodiments, the additional device 180 is calibrated when initially positioned in the vehicle, or moved within the vehicle, to determine the orientation of the additional device 180 within the vehicle, e.g., to define the X, Y, and Z axes of the vehicle with reference to the additional device 180. This orientation may be important for proper scaling and calculation of G forces. In some embodiments, safety-related events may not be triggered until proper calibration of the additional device 180 is completed.

Moving to block 712, if a safety-related event has been triggered, the method continues to block 714 where an in-vehicle alert may be provided within the vehicle and event data associated with the safety-related event is identified and transmitted at block 720. The in-vehicle alerts may be customized, such as based on the type of triggered event, severity of the event, driver preferences, etc. For example, in-vehicle alerts may include various audible signals and/or visual indicators of triggered safety-related events. In some implementations, the event data that is transmitted to the management server 140 includes metadata associated with the triggered event. For example, the metadata may include a triggering reason (e.g., an indication of which safety-related event was triggered) and acceleration data in at least the axis associated with the triggered acceleration threshold. Additional metadata, such as location of the vehicle (e.g., from a GPS sensor), speed of the vehicle, and the like, may also be transmitted with the event data. In some embodiments, event data that is transmitted to the management server 140 is selected based on settings of the triggered safety-related event. For example, a first safety-related event may indicate that the event data that is initially transmitted to the management server 140 comprises particular metadata, e.g., accelerometer data, for a first time frame (e.g., from five seconds before the event triggered until two seconds after the event triggered). Similarly, a second safety-related event may indicate that the event data that is initially transmitted to the management server 140 includes a different subset of metadata for a different time frame. Additionally, the event data that is initially transmitted to the management server 140 may include data assets, such as one or more frames of video data from one or more of the forward-facing and/or driver-facing cameras.

However, even if a safety-related event has not been triggered, at block 718 the model outcome and the event data can be recorded. For example, the recorded data can be used to further update the event model at a later time.

In some embodiments, the additional device 180 executes rules (or event models) that determine whether even the metadata is transmitted to the management server 140. For example, a rule may indicate that triggering of a particular event type that has not been detected during a predetermined time period should not initiate transmission of event data to the management server 140. Rather, the rule may indicate that the in-vehicle alert is provided to the driver as a "nudge" to correct and/or not repeat actions that triggered the safety-related event. The rules may further indicate that upon occurrence of the same safety-related event within a subsequent time period (e.g., 30 minutes, 60 minutes, etc.), the additional device 180 should cause event data regarding both of the detected events to be transmitted. Similarly, the rules may cause event data to be transmitted only upon occurrence of other quantities of safety-related events (e.g., three, four, five, etc.) during other time periods (e.g., 10 minutes, 20 minutes, 60 minutes, two hours, four hours, etc.). Such rules may further be based upon severity of the triggered safety-related events, such that a high severity harsh event may be transmitted immediately, while a low severity harsh event may only be transmitted once multiple additional low severity harsh events are detected.

In some embodiments, video and/or audio data are recorded in a data store, even though such data may not be transmitted to the management server 140 initially upon triggering of a safety-related event (e.g., at block 720). However, in some implementations, video and/or audio data may be selected for upload to the management server 140 in response to detection of an event. For example, video data from a time period immediately preceding the detected event may be marked for transmission to the management server 140. The video and/or audio data may be transmitted when the communication link supports transmission of the video and/or audio data, such as when the vehicle is within a geographic area with a high cellular data speed. Alternatively, the video and/or audio data may be transmitted when connected on a nightly basis, such as when the vehicle is parked in the garage and connected to Wi-Fi (e.g., that does not charge per kilobyte). Accordingly, the additional device 180 advantageously provides immediate in—vehicle alerts upon detection of a safety-related event, while also allowing the management server 140 to later receive video and/or audio data associated with the detected safety-related event, such as to perform further analysis of the safety-related event (e.g., to update event models applied by the additional device 180).

In some embodiments, once particular video and/or audio data is transmitted to the management server 140, that particular video and/or audio data is removed from the data store of the additional device 180. For example, if a five second video clip associated with a safety-related event is transmitted to the management server 140, that five second portion of the video stream may be removed from the data store. In some embodiments, video and/or audio data is only deleted from the additional device 180 when management server 140 indicates that the particular video and/or audio data may be deleted, or until the video and/or audio data has become stale (e.g., a particular asset data is the oldest timestamped data in the data store and additional storage space on the data store is needed for recording new sensor data).

In some embodiments, the management server 140 receives the event data, which may initially be only metadata associated with a safety-related event, as noted above, and stores the event data for further analysis at block 720. The event data may then be used to perform one or more processes that provide further information to a user (e.g., a safety manager or analyst) and/or are used to improve or update the event models executed on the additional device 180.

Moving to block 721, an event type associated with the detected safety-related event may be determined. In particular, the management server 140 may first determine an event type associated with the detected safety-related event. The event type may then be used to select one or more event models to be tested or updated based on the event data. For example, event data associated with a tailgating event type may be analyzed using a tailgating model in the backend that is more sophisticated than the tailgating model used in the additional device 180. For example, the event models applied in the management server 140 (or backend event models) may take as inputs additional sensor data, such as video data, in detecting occurrence of safety-related events. Thus, the event models applied in the management server 140 may require additional event data beyond the initial event data received initially upon triggering of the safety-related event at the additional device 180. Thus, in some embodiments, the management server 140 at block 724 determines if additional event data is needed to execute the selected backend event model.

At block 723, if additional event data is needed, a request for the particular event data is generated and transmitted in a data request for fulfillment by the additional device 180. In some embodiments, the data request includes specific asset data requirements, such as a time period of requested video or audio data, minimum and/or maximum resolution, frame rate, file size, etc. The additional asset data request may be fulfilled by the additional device 180 at block 720 by causing further event data to be sent to the management server 140. This process may be repeated multiple times until the event data needed to evaluate the selected backend models.

In some embodiments, the management server 140 applies default and/or user configurable rules to determine which data is requested from the additional device 180. For example, a rule may be established that excludes requests for additional data when data for the same type of safety-related event has already been received during a particular time period. For example, the rules may indicate that data is requested only for the first 5 occurrences of harsh turning events during a working shift of a driver. Thus, the management server 140 receives additional data for some of the safety-related events and preserves bandwidth and reduces costs by not requesting data for all of the safety-related events, due to the limited value of analyzing the additional data associated with a recurring triggered safety-related event. In some embodiments, a data request at block 723 includes an indication of urgency of fulfillment of the data request, such as whether the asset data is needed as soon as possible or if acceptable to provide the asset data only when bandwidth for transmitting the asset data is freely available.

When sufficient event data is provided to the management server 140, the selected backend models may be executed at block 727. In some embodiments, execution of event models at the management server 140 comprises training one or more event models for better detection of the determined event type. For example, in some embodiments the management server 140 evaluates data that was not considered by the additional device 180 in triggering the initial safety-related event. The management server 140 may provide suggestions and/or may automatically update event models that are restricted to analysis of certain event data (e.g., event metadata and/or certain types of asset data) based on analysis of asset data that is not analyzed by the updated event model. For example, analysis of video data associated with a safety-related event may identify correlations between features in the video data and acceleration data that may be used to update criteria or thresholds for triggering the particular safety-related event by the additional device 180 (without the additional device 180 analyzing video data). Advantageously, event data across large quantities of vehicles may be considered in determining updates to the event models that are executed on the additional device 180.

In some embodiments, event models include neural networks that are updated over time to better identify safety-related events. Thus, at block 727, event data may become part of a training data set for updating/improving a neural network configured to detect the safety-related event. A number of different types of algorithms may be used by the machine learning component to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component. For example, the models can be regenerated on a periodic basis as new received data is available to help keep the predictions in the model more accurate as the data is collected over time. Also, for example, the models can be regenerated based on an ad-hoc basis, e.g., triggered by a user or management device.

Some additional non-limiting examples of machine learning algorithms that can be used to generate and update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate models without manual analysis or review by one or more people.

After execution of the backend models at block 727, event models associated with the determined event type may be updated at block 728, and in some embodiments certain of the updated event models are transmitted back to the additional device 180 for execution in determining future safety-related events. A user interface on a management device may include an option for the user to provide feedback on accuracy of the detected events, such as an indication of whether the safety-related event actually occurred or if the triggering event should be considered a false positive. Based on this user feedback, the event models may be updated at block 728, potentially for transmission back to the additional device 180.

Figure 8:
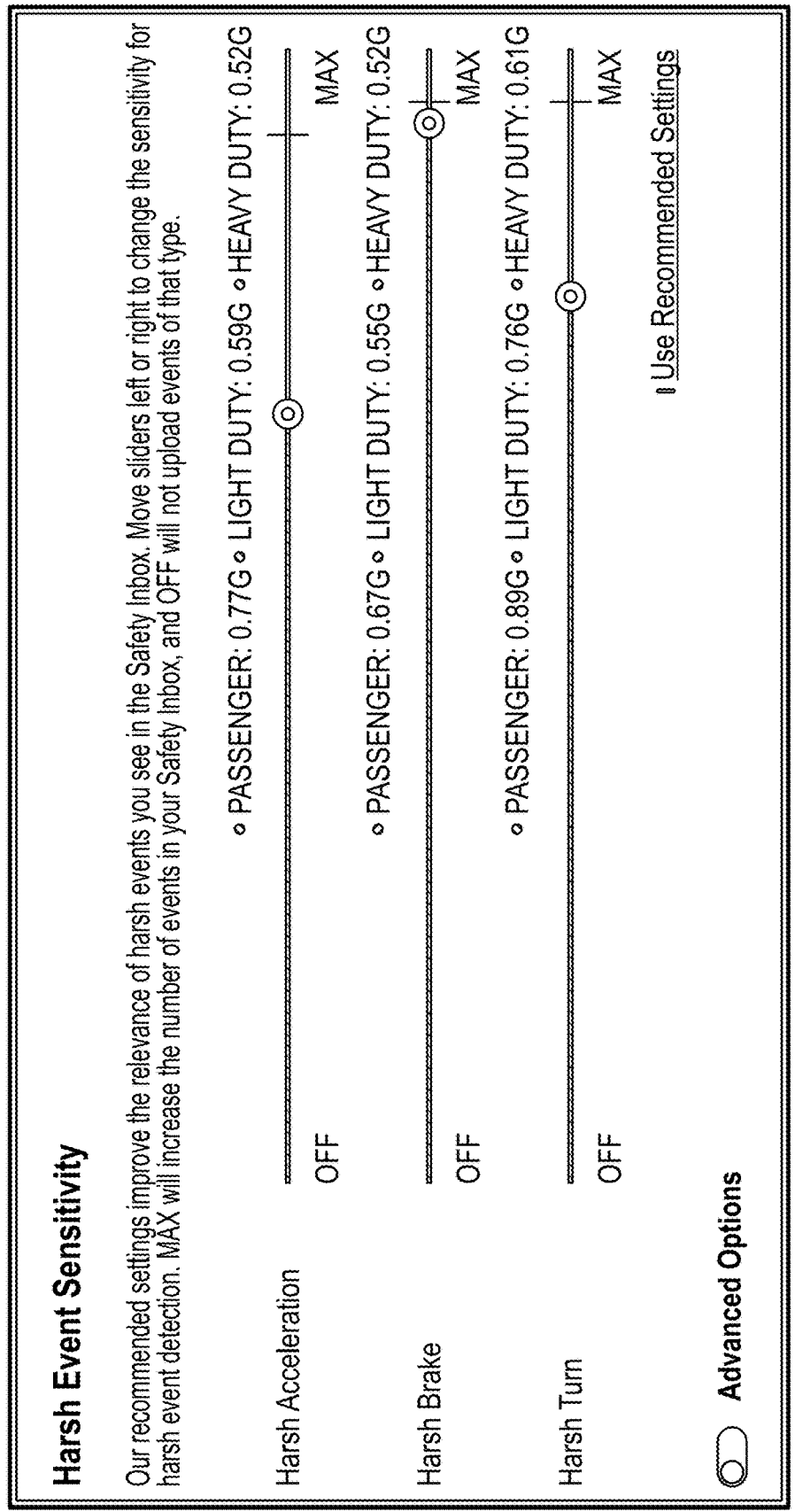
FIG. 8 is an example user interface that may be accessed by a user to designate harsh event customizations, according to various embodiments of the present disclosure.

FIG. 8 is an example user interface 800 that may be accessed by a user to designate safety-related event customizations. In this example, the user may select a threshold acceleration (in this example shown in G forces) for each of three different harsh events, namely acceleration, breaking, and turning. The user interface provides default levels based on type of vehicle, which the user can choose to implement and/or can move the sliders associated with the three different types of harsh events to select a custom G force level. In this example, G force levels in the X axis (e.g., corresponding to a length of a vehicle) may be used to trigger the harsh acceleration and harsh breaking events, while G force levels in the Y axis (e.g., perpendicular to the X axis) may be used to trigger the harsh turn event. In some embodiments, a particular harsh event may not be triggered until multiple G force levels reach a threshold, such as a X and Z axis threshold that may be associated with a harsh turn event.

X. EXAMPLE COHORT GRAPHICAL USER INTERFACES

FIGS. 9A, 9B, 9C, 9D, and 9E illustrate example graphical user interfaces for presenting cohorts and metrics, according to various embodiments of the present disclosure. The interactive graphical user interfaces of FIGS. 9A, 9B, 9C, 9D, and 9E may be provided by the management server 140, and may be accessible via user device(s) 120. In general, received data are automatically gathered from multiple vehicle gateway devices 150 and/or additional devices 180 by the management server 140 (as described herein), and the received data may then be further aggregated and analyzed to provide information and insights as described herein.

Figure 9A:
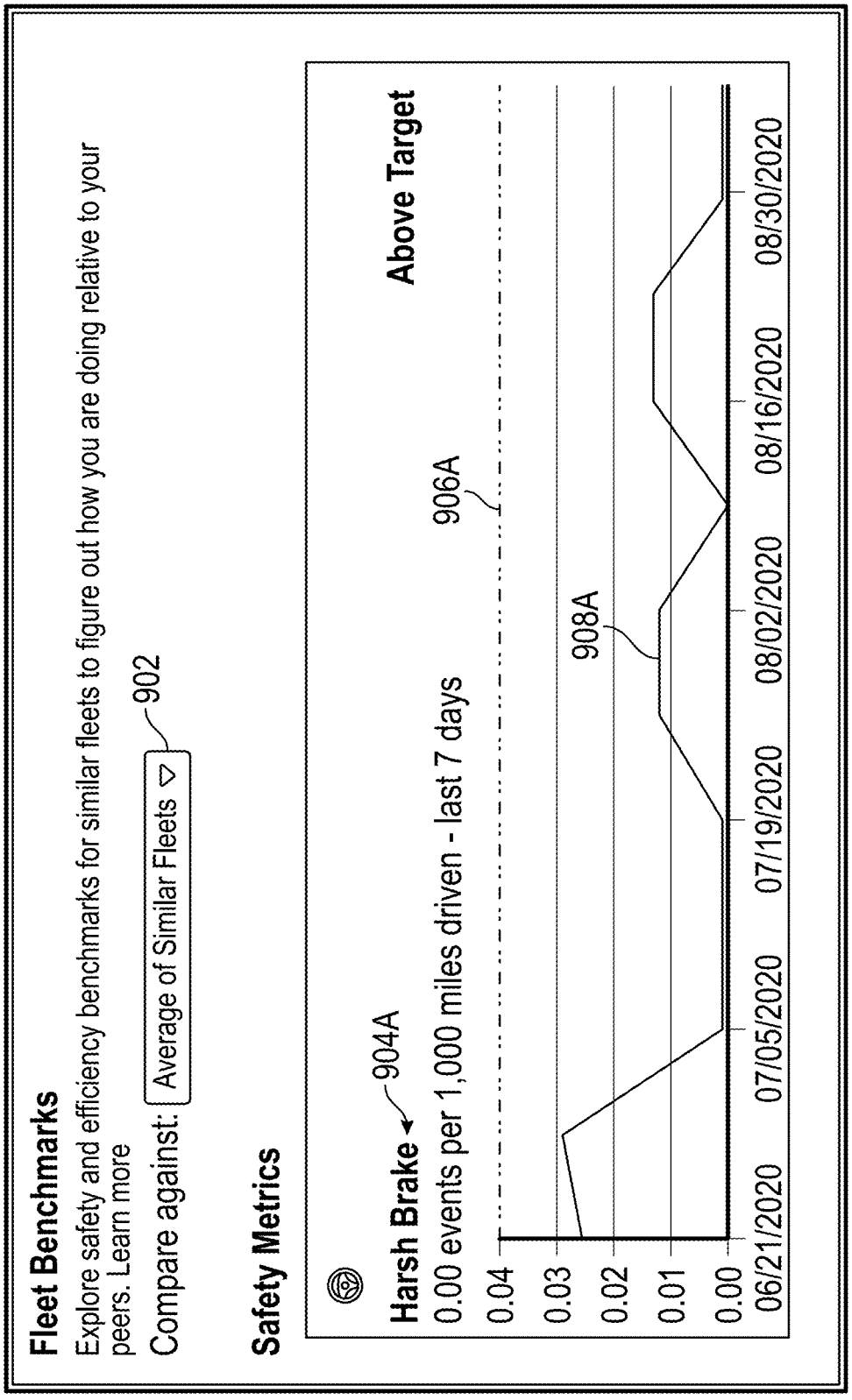
FIGS. 9A, 9B, 9C, 9D, and 9E illustrate example graphical user interfaces for cohort benchmarks, according to various embodiments of the present disclosure.

FIG. 9A illustrates an example interactive graphical user interface 900 for presenting metric and benchmark data. The graphical user interface 900 can include a first visualization 904A. The first visualization 904A can indicate a first metric for a fleet relative to a first benchmark for the fleet's cohort. As shown, the first visualization 904A can include a first graph (here a graph for the harsh brake events per 1,000 miles driven metric). The first visualization 904A can further depict a first benchmark element 906A and a first metric element 908A. In the graph example, the first benchmark element 906A is a line plot depicting the harsh brake events per 1,000 miles driven for a fleet's cohort (approximately 0.04 harsh brake events per 1,000 miles driven) and the first metric element 908A is a line plot depicting the harsh brake events per 1,000 miles driven for the particular fleet. As shown, the first metric for the fleet is "above" the target benchmark in the sense that the particular fleet has a better performance safety metric than the cohort. Specifically, the particular fleet has less harsh brake events per 1,000 miles driven than the same benchmark for the fleet's cohort.

The graphical user interface 900 can include a comparison element 902. Selection of the comparison element can cause the graphical user interface 900 to dynamically update. The "Average of Similar Fleets" option can be selected for the comparison element 902. In some embodiments, additional comparison options for the comparison element 902 can include an option for a different statistical measure, such as mode or median of a fleet's cohort, top ten percent of fleets in the cohort, or top ten percent of all fleets. Additionally or alternatively, an additional comparison option could be for benchmarks for fleets other than the fleets in the cohort, such as every fleet available. Selection of the comparison element 902 can cause the first benchmark element 906A to dynamically update to reflect the selected comparison element 902.

Figure 9B:
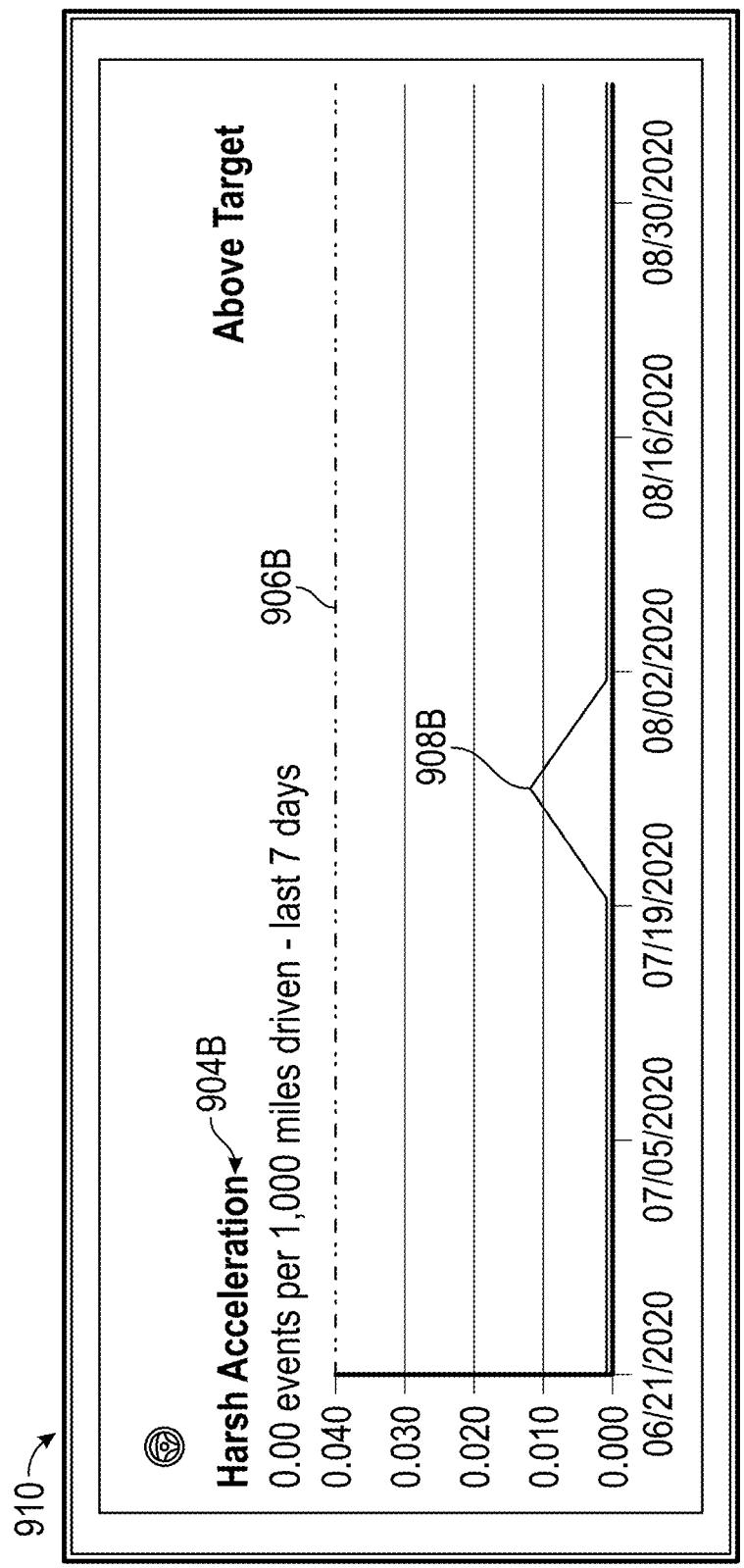

FIG. 9B illustrates another example graphical user interface 910 for presenting metric and benchmark data. The graphical user interface 910 of FIG. 9B can be similar to the graphical user interface 900 of FIG. 9A. The graphical user interface 910 of FIG. 9B can have a second visualization 904B that is similar to the first visualization 904A of the graphical user interface 900 of FIG. 9A. However, the second visualization 904B of FIG. 9B can present a second metric/benchmark (here a harsh acceleration metric/benchmark) different from the first metric/benchmark (a harsh brake metric/benchmark) of the first visualization 904A of FIG. 9A. Moreover, the graphical user interface 910 of FIG. 9B can be a continuation of the graphical user interface 900 of FIG. 9A.

The second visualization 904B can indicate a second metric for a fleet relative to a second benchmark for the fleet's cohort. As shown, the second visualization 904B can include a second graph (here a graph for the harsh acceleration events per 1,000 miles driven metric). The second visualization 904B can further depict a second benchmark element 906B and a second metric element 908B. In the graph example, the second benchmark element 906B is a line plot depicting the harsh acceleration events per 1,000 miles driven (approximately 0.04 harsh acceleration events per 1,000 miles driven) for a fleet's cohort and the second metric element 908B is a line plot depicting the harsh acceleration events per 1,000 miles driven for the particular fleet. As shown, the second metric for the fleet is "above" the target benchmark in the sense that the particular fleet has a better performance safety metric than the cohort. Specifically, the particular fleet has less harsh acceleration events per 1,000 miles driven than the same benchmark for the fleet's cohort.

Figure 9C:
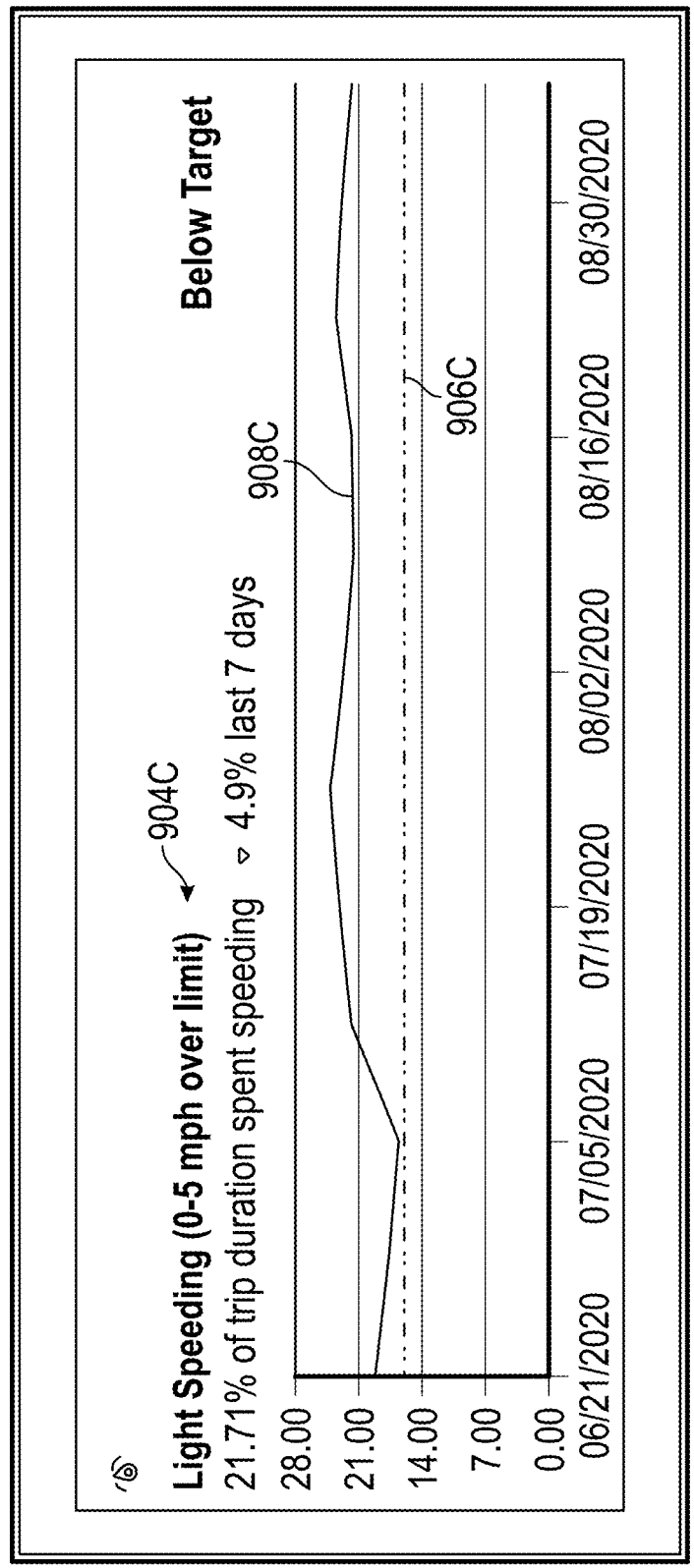

FIG. 9C illustrates another example graphical user interface 920 for presenting metric and benchmark data. The graphical user interface 920 of FIG. 9C can be similar to the graphical user interface 900 of FIG. 9A. The graphical user interface 920 of FIG. 9C can have a third visualization 904C that is similar to the first visualization 904A of the graphical user interface 900 of FIG. 9A. However, the third visualization 904C of FIG. 9C can present a third metric/benchmark (here a light speeding metric/benchmark) different from the first metric/benchmark (a harsh brake metric/benchmark) of the first visualization 904A of FIG. 9A. The light speeding metric can be defined as a percentage of trip durations where there was speeding 0-5 mph over the speed limit. Moreover, the graphical user interface 920 of FIG. 9C can be a continuation of the graphical user interface 900, 910 of FIGS. 9A, 9B.

The third visualization 904C can indicate a third metric for a fleet relative to a third benchmark for the fleet's cohort. As shown, the third visualization 904C can include a third graph (here a graph for the light speeding metric). The third visualization 904C can further depict a third benchmark element 906C and a third metric element 908C. In the graph example, the third benchmark element 906C is a line plot depicting the percentage of trip durations spent with light speeding (approximately 14 percent of trip durations spent speeding 0-5 mph over the speed limit) for a fleet's cohort and the third metric element 908C is a line plot depicting the percentage of trip durations spent with light speeding for the particular fleet (approximately 21 percent of trip durations spent speeding 0-5 mph over the speed limit). As shown, the third metric for the fleet is "below" the target benchmark in the sense that the particular fleet has a worse performance safety metric than the cohort. Specifically, the particular fleet has a greater percentage of trip durations with light speeding than the same benchmark for the fleet's cohort.

In some embodiments, the visualizations can depict whether a fleet's metric is above or below the target benchmark with further indicators. For example, in the graph of FIG. 9C, the third metric element 908C can be a color-coded line plot (such as the color red) that indicates that, as previously mentioned, the third metric for the fleet is "below" the target benchmark in the sense that the particular fleet has a worse performance safety metric than the cohort. In contrast, in the graph of FIG. 9A, the first metric element 908A can be a color-coded line plot (such as the color green) that indicates that, as previously mentioned, the first metric for the fleet is "above" the target benchmark in the sense that the particular fleet has a better performance safety metric than the cohort.

Figure 9D:
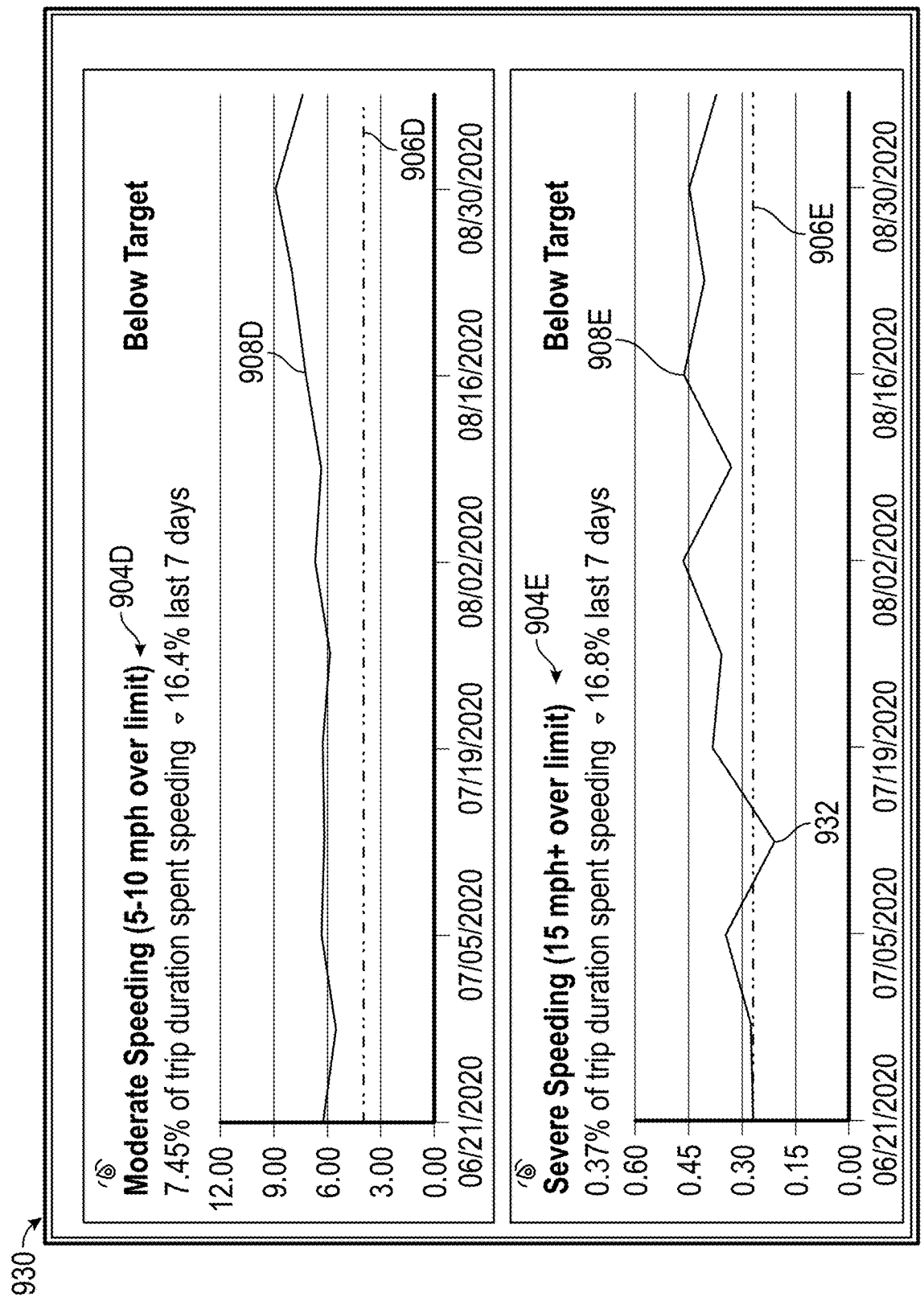

FIG. 9D illustrates another example graphical user interface 930 for presenting metric and benchmark data. The graphical user interface 930 of FIG. 9D can be similar to the graphical user interface 920 of FIG. 9C. The graphical user interface 930 of FIG. 9D can have a fourth visualization 904D and a fifth visualization 904E that are similar to the third visualization 904C of the graphical user interface 920 of FIG. 9C. However, the fourth visualization 904D and the fifth visualization 904E of FIG. 9D can present fourth and fifth metrics/benchmarks (here a moderate speeding metric/benchmark and a severe speeding metric/benchmark, respectively) different from the third metric/benchmark (a light speeding metric/benchmark) of the third visualization 904C of FIG. 9C. The moderate speeding metric can be defined as a percentage of trip durations where there was speeding 5-10 mph over the speed limit. The severe speeding metric can be defined as a percentage of trip durations where there was speeding greater than 15 mph over the speed limit. Moreover, the graphical user interface 930 of FIG. 9D can be a continuation of the graphical user interface 900, 910, 920 of FIGS. 9A, 9B, 9C.

The fourth visualization 904D can indicate a fourth metric for a fleet relative to a fourth benchmark for the fleet's cohort. As shown, the fourth visualization 904D can include a fourth graph (here a graph for the moderate speeding metric). The fourth visualization 904D can further depict a fourth benchmark element 906D and a fourth metric element 908D. In the graph example, the fourth benchmark element 906D is a line plot depicting the percentage of trip durations spent with moderate speeding (approximately 3 percent of trip durations spent speeding 5-10 mph over the speed limit) for a fleet's cohort and the fourth metric element 908D is a line plot depicting the percentage of trip durations spent with moderate speeding for the particular fleet (approximately 7.45 percent of trip durations spent speeding 5-10 mph over the speed limit). As shown, the particular fleet has a greater percentage of trip durations with moderate speeding than the same benchmark for the fleet's cohort.

The fifth visualization 904E can indicate a fifth metric for a fleet relative to a fifth benchmark for the fleet's cohort. As shown, the fifth visualization 904E can include a fifth graph (here a graph for the severe speeding metric). The fifth visualization 904E can further depict a fifth benchmark element 906E and a fifth metric element 908E. In the graph example, the fifth benchmark element 906E is a line plot depicting the percentage of trip durations spent with severe speeding (approximately 0.3 percent of trip durations spent speeding greater than 15 mph over the speed limit) for a fleet's cohort and the fifth metric element 908E is a line plot depicting the percentage of trip durations spent with severe speeding for the particular fleet (approximately 0.37 percent of trip durations spent speeding greater than 15 mph over the speed limit). As shown, the particular fleet generally has a greater percentage of trip durations with sever speeding than the same benchmark for the fleet's cohort.

In some embodiments, the visualizations can depict whether a fleet's metric is above and/or below the target benchmark with further indicators. While not illustrated in the fifth graph of the fifth visualization 904E of FIG. 9D, the fifth metric element 908E can be a color-coded line plot that indicates where particular values for the fifth metric for the fleet are "above" and/or "below" the target benchmark. For example, in the fifth graph of the fifth visualization 904E, the line plot of the fifth metric element 908E can be a first color (such as the color red) where the value of the fifth metric is "below" the benchmark target (in this case where the fifth metric has a higher value than the value of the target benchmark) and the line plot of the fifth metric element 908E can also be a second color (such as the color green) where the value of the fifth metric is "above" the benchmark target (in this case where the fifth metric has a lower value than the value of the target benchmark), such as at the point 932.

Figure 9E:
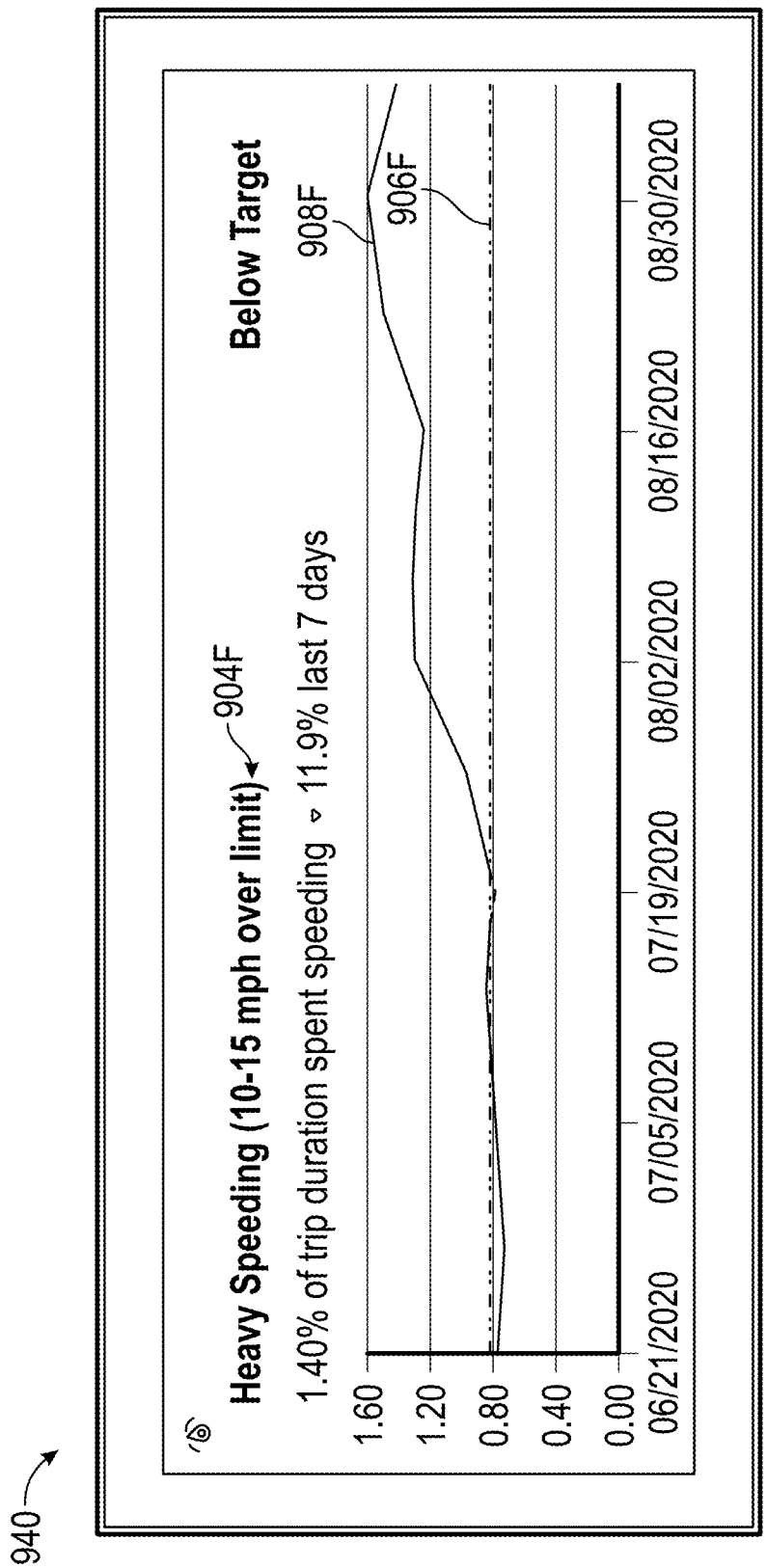

FIG. 9E illustrates another example graphical user interface 940 for presenting metric and benchmark data. The graphical user interface 940 of FIG. 9E can be similar to the graphical user interface 920 of FIG. 9C. The graphical user interface 940 of FIG. 9E can have a sixth visualization 904F that is similar to the third visualization 904C of the graphical user interface 920 of FIG. 9C. However, the sixth visualization 904F of FIG. 9E can present sixth metric/benchmark (here a heavy speeding metric/benchmark) different from the third metric/benchmark (a light speeding metric/benchmark) of the third visualization 904C of FIG. 9C. The heavy speeding metric can be defined as a percentage of trip durations where there was speeding 10-15 mph over the speed limit. Moreover, the graphical user interface 940 of FIG. 9E can be a continuation of the graphical user interface 900, 910, 920, 930 of FIGS. 9A, 9B, 9C, 9D.

The sixth visualization 904F can indicate a sixth metric for a fleet relative to a sixth benchmark for the fleet's cohort. As shown, the sixth visualization 904F can include a sixth graph (here a graph for the moderate speeding metric). The sixth visualization 904F can further depict a sixth benchmark element 906F and a sixth metric element 908F. In the graph example, the sixth benchmark element 906F is a line plot depicting the percentage of trip durations spent with heavy speeding (approximately 0.8 percent of trip durations spent speeding 10-15 mph over the speed limit) for a fleet's cohort and the sixth metric element 908F is a line plot depicting the percentage of trip durations spent with heavy speeding for the particular fleet (approximately 1.4 percent of trip durations spent speeding 10-15 mph over the speed limit). As shown, the particular fleet generally has a greater percentage of trip durations with moderate speeding than the same benchmark for the fleet's cohort. In some embodiments, the line plot of the sixth metric element 908F is similar to the line plot of the fifth metric element 908E of FIG. 9D in that the line plots can include indicators (such as a red/green colors) that indicate where values of the line plot are "above" or "below" the target benchmark. The speeding ranges depicted in FIGS. 9C, 9D, 9E (such as speeding 0-5, 5-10, 10-15, or greater than 15 mph over a speed limit) are example speeding ranges and other ranges can be used in different embodiments.

XI. EXAMPLE METRIC AND BENCHMARK GENERATION

Figure 10:
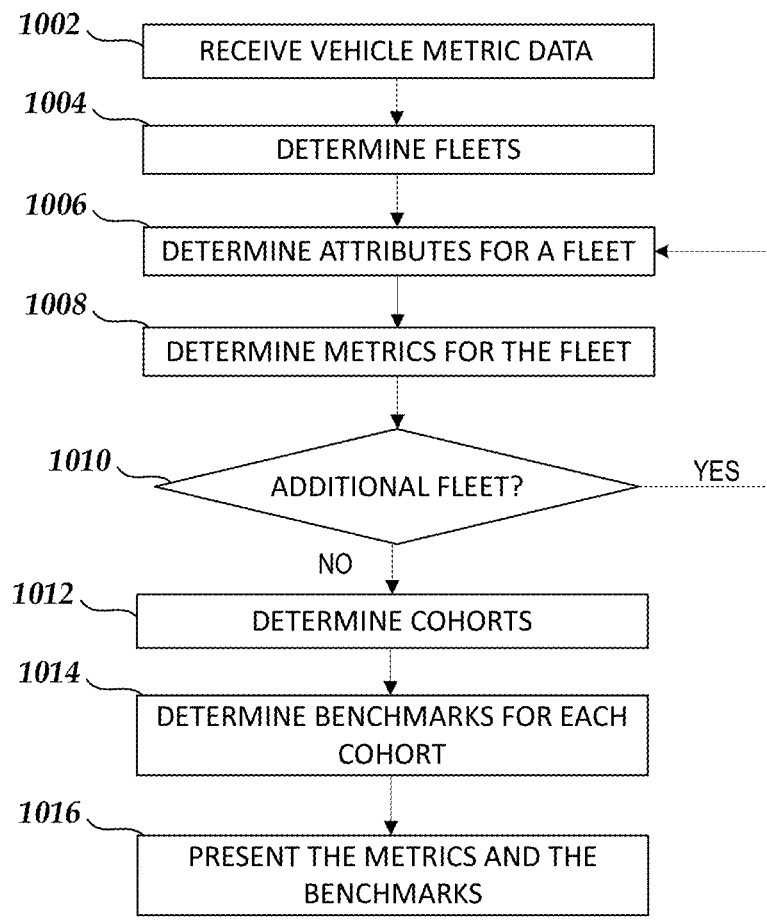
FIG. 10 is a flowchart illustrating example methods and functionality related to generating metrics and benchmarks, according to various embodiments of the present disclosure.

FIG. 10 is a flowchart illustrating example methods and functionality related to generating metrics and benchmarks and presenting the metrics and benchmarks in graphical user interfaces.

Beginning at block 1002, vehicle-related data (including vehicle metric data) can be received. In particular, the management server 140 can receive vehicle-related data from the vehicle gateway devices 150 and/or the additional devices 180. As described herein, example vehicle-related data can include vehicle metric data, vehicle location data, and/or additional devices data. The vehicle-related data, such as the vehicle metric data, can include geographical coordinates. The vehicle metric data can include miles driven. The management server 140 can receive harsh event metric data and/or speed data from the vehicle gateway devices 150 and/or the additional devices 180. Each of the vehicle metric data, such as the speed data, can be associated with respective geographical coordinates, such as an approximate location where a speed measurement occurred. Thus, the speed data can represent a speed of a vehicle at the geographical coordinate. In some embodiments, the harsh event metric data can include at least one of a harsh acceleration event, a harsh braking event, or a crash event associated with a vehicle. As described herein, the vehicle-related data can be received for many vehicles and for many fleets over a period of time.

In some embodiments, vehicle-related data can include weather data. Example weather data can include the weather associated with the locations where vehicles in a fleet operate. As described herein, weather data can be used for determining attributes and/or cohorts. Additional vehicle-related data can include Hours of Service (HOS) violations. For example, commercial fleets typically have a certain set of regulations that fleets need to follow, such as drivers having a maximum amount of time they can drive per day, failing to electronically log trips, etc.

The management server 140 can determine trips for a vehicle from the vehicle-related data. A trip can represent a starting and ending locations for a vehicle, and vehicle-metric data can be associated with the trip. For example, a trip can correspond to a delivery for a vehicle. The management server 140 can use various logic to determine trips. For example, a vehicle may have to be moving at a certain speed to be classified as a trip. The vehicle also may not be idle for greater than a number of minutes to be classified as a trip. There can be some logic around crossing state lines; even if the vehicle is moving at the same speed and doesn't stop, the trip can get broken up into two trips when the vehicle enters a new state.

Additional details regarding transmitting and receiving vehicle-related data are described in further detail above with respect to the block(s) of FIGS. 4A-4B, 5, and 7. For example, as described herein (such as with respect to FIGS. 6 and 7), the additional device 180 (such as a dashboard camera) can include an accelerometer configured to generate accelerometer data. In some embodiments, the vehicle gateway device 150 is configured to receive, from the additional device 180, the vehicle metric data, which can be based at least in part on the accelerometer data. The additional device 180 can include a processor that is configured to detect at least one of a harsh acceleration event, a harsh braking event, or a crash event from the accelerometer data. As described herein (such as with respect to FIG. 7), the additional device 180 can analyze at least the accelerometer data with an event model to determine vehicle metric data, such as a harsh acceleration event, a harsh braking event, or a crash event.

At block 1004, fleets can be determined. In particular, the management server 140 can determine the fleets. For example, the management server 140 can determine the fleets from the organizations/drivers/vehicles database 258. The management server 140 can associate the vehicle metric data with particular vehicles and the fleets associated with those vehicles. Accordingly, the management server 140 can determine a fleet for each vehicle in a collection of vehicles. The management server 140 can apply logic to remove fleets from being included in a cohort and/or from being eligible to be compared to a cohort. For example, the management server 140 can determine whether a particular fleet satisfies a base threshold to be included in the analysis, such as by driving at least five miles per day over a period of time (such as a month). In particular, the management server can calculate a value from respective vehicle metric data associated with a particular fleet (such as total miles driven per day), determine that the value fails to satisfy a threshold (such as five miles), and in response to determining that the value fails to satisfy the threshold, exclude the particular fleet from the collection of fleets for further processing. Conversely, the management server can calculate a value from respective vehicle metric data associated with a particular fleet (such as total miles driven per day), determine that the value fails satisfies the threshold (such as five miles), and in response to determining that the value satisfies the threshold, include the particular fleet in the collection of fleets for further processing.

At block 1006, attributes can be determined for a fleet. In particular, the management server 140 can determine segmentation attributes for a particular fleet. Example segmentation attributes can be an attribute indicating a driving characteristic for a fleet, an attribute indicating fleet size, an attribute indicating fleet composition, and an attribute indicating a type of geography associated with a fleet. Example attributes indicating driving characteristics can include an attribute indicating a distance driven per unit of time (such as distance driven in miles per day), an attribute indicating a distance driven per vehicle (such as distance driven in miles per vehicle), an attribute indicating a trip length, an attribute indicating number of trips per unit of time (such as a number of trips per day), an attribute indicating number of trips per vehicle, an attribute indicating total trip duration per unit of time (such as total trip duration per day), and an attribute indicating total trip duration per vehicle. An example attribute indicating fleet size can include an attribute indicating a number of vehicles in the fleet (such as a number of unique vehicles in the fleet). An example attribute indicating fleet composition can include an attribute indicating a vehicle type composition of the fleet (such as a percentage of passenger type vehicles in the fleet). An example attribute indicating a type of geography associated with a fleet can include an attribute indicating a type of driving, such as a percentage of trips starting or ending in a city, which can indicate urban or highway driving.

The management server 140 can determine the segmentation attributes for a particular fleet from the vehicle metric data. For example, for each fleet, the management server 140 can calculate distance driven in miles per day for each fleet (such as by calculating the total miles driven for every vehicle in the fleet per day), distance driven in miles per vehicle in the fleet (such as by calculating the average miles driven for every vehicle in the fleet per day), a trip length (such as by calculating the average trip length in the fleet), number of trips per day in the fleet, a number of trips per vehicle in the fleet, total trip duration per day (such as by calculating the total trip duration in hours in the fleet per day), and total trip duration per vehicle (such as by calculating the average duration in hours for each vehicle in the fleet per day), and/or active vehicles in the fleet. The management server 140 can calculate a value of distance driven per unit of time by vehicles from the fleet over a period of time, and can assign the value to an attribute. In some embodiments, the management server 140 can calculate a statistical measure (such as an average, median, or mode) of distance driven per unit of time by vehicles from the fleet over a period of time, and can assign the statistical measure to an attribute.

For each fleet, the management server 140 can calculate a percentage of passenger vehicles in the fleet, such as by calculating the percentage of unique vehicles in the fleet with a passenger cable and/or that use a particular vehicle bus protocol. An example passenger cable can be an OBD-II cable. Vehicles that use the OBD-II protocol and connectors can be categorized as passenger vehicles, whereas vehicles that use the J1939 protocol and connectors can be categorized as non-passenger vehicles. In particular, the management server 140 can calculate a value representing a vehicle type composition of the fleet (such as a percentage) based at least in part on vehicle gateway devices with respective connections to the vehicles from the fleet, where calculating the statistical measure further include determining an indicator that each respective connection uses a passenger cable, and assigning the value to an attribute.

For each fleet, the management server 140 can calculate a percentage of trips in the fleet that either start or end in a "city." In some embodiments, the management server 140 can use a list of cities (such as 100 or 200 cities) to define a "city," such that trips with start or end geographical coordinates that fall within the geographical areas from the list of cities can be treated as a trip starting or ending in a "city." The management server 140 can further calculate the percentage of trips by dividing a number of trips for a fleet starting or ending in a "city" by a total number of trips for the fleet. In particular, the management server 140 can calculate a value representing a type of geography based at least in part on vehicles from the fleet that started or ended a trip in a city from a list of predetermined cities, and assigning the value to an attribute.

In some embodiments, a set of segmentation attributes for a fleet can include a first attribute indicating a distance driven per vehicle in the fleet, a second attribute indicating a trip length of the fleet, a third attribute indicating a vehicle type composition of the fleet, and a fourth attribute indicating a type of geography associated with the fleet. Additionally or alternatively, another set of segmentation attributes for a fleet can include a first attribute indicating a distance driven per unit of time, a second attribute indicating a distance driven per vehicle, a third attribute indicating a trip length, a fourth attribute indicating number of trips per unit of time, a fifth attribute indicating number of trips per vehicle, a sixth attribute indicating total trip duration per unit of time, a seventh attribute indicating total trip duration per vehicle, an eighth attribute indicating a number of vehicles in the fleet, a ninth attribute indicating a vehicle type composition of the fleet, and a tenth attribute indicating a type of driving. Yet another set of segmentation attributes for a fleet can include a first attribute indicating a first driving characteristic, a second attribute indicating a second driving characteristic, a third attribute indicating fleet size, a fourth attribute indicating fleet composition, and a fifth attribute indicating a type of geography associated with the fleet.

In some embodiments, attributes can be related to weather. An example segmentation attribute can be percent of operations in ideal, moderate, or harsh climates. In some embodiments, the management server 140 can determine percent of operations in one or more climates by correlating operations data of vehicles (including the time and location of vehicles during operation) with the climate data. For example, if a fleet operates in Texas most of the year, then that particular fleet may have well above 90 percent operations in an ideal or temperate climate as a segmentation attribute. Conversely, a fleet operating in Boston may have approximately 50 percent operations in a harsh climate as a segmentation attribute.

At block 1008, metrics can be determined for a fleet. In particular, the management server 140 can determine metrics for a particular fleet. Example metrics can include safety metrics, such as harsh brake, harsh acceleration, and/or speeding metrics. In particular, an example harsh brake metric can include a harsh brake events per 1,000 miles driven metric. The management server 140 can determine, from the vehicle metric data, the miles driven by every vehicle in a fleet and the number of harsh brake events for a particular time period, such as a day. Accordingly, the management server 140 can calculate, from the vehicle metric data, the harsh brake events per 1,000 miles driven from every vehicle in the fleet for a period of time (such as each day). As shown, in FIG. 9A, an example harsh brake metric can be 0 on some days or 0.01 or 0.02 harsh brake events per 1,000 miles driven on different days depending on the vehicle metric data for that day. An example harsh acceleration metric can include a harsh acceleration events per 1,000 miles driven metric. The management server 140 can determine, from the vehicle metric data, the miles driven by every vehicle in a fleet and the number of harsh acceleration events for a particular time period, such as a day. The management server 140 can calculate, in a similar manner to the harsh brake metric calculations, the harsh acceleration events per 1,000 miles driven from every vehicle in the fleet for a period of time. An example visualization of the harsh acceleration metric is shown and described above with respect to FIG. 9B.

As described herein, example speeding metrics can include metrics that indicate a category of speeding, such as light speeding, moderate speeding, heavy speeding, and severe speeding. Each category of speeding (such as light speeding, moderate speeding, heavy speeding, and severe speeding) can be associated with a speed range (such as over the speed limit by 0-5 mph, 5-10, mph, 10-15 mph, and greater than 15 mph, respectively). The speeding metrics can further indicate how much each category of speeding was a percentage of a trip duration, such as a percentage of trip durations where there was speeding 0-5 mph over the speed limit or a percentage of trip durations where there was speeding 5-10 mph over the speed limit, etc. The management server 140 can determine, from the vehicle metric data, the speed of vehicles on trips that are associated with location data, such as geographical coordinates, over a time period, such as a day. The management server 140 can further determine speed limits associated with those coordinates. Accordingly, the management server 140 can calculate, from the vehicle metric data, the percentage of trip durations where there was speeding in certain ranges from every vehicle in the fleet for a period of time (such as each day). As shown, in FIG. 9C, an example light speeding metric can be approximately 21 percent and can vary from day to day. Additional speeding metrics are shown and described above with respect to FIGS. 9D and 9E.

In some embodiments, the management server 140 can determine other metrics based at least in part on the vehicle metric data. Additional example metrics can be based at least on cruise control use, coasting, accelerator pedal use, idling, battery state, anticipation, motor rotations per minute, motor power, fuel level, engine RPM, engine torque, engine load, and/or brake use. For example, a metric can indicate the RPM band ranges that vehicle's in a fleet operate within, which can be indicative of fuel efficiency performance. Additional example metrics could be metrics that include a weather component, such as harsh brake events or crash events that occur in harsh climates. Yet further additional metrics can include Hours of Service (HOS) violations-related metrics. Thus, for each fleet, the management server 104 can determine the number of HOS violations over a period of time.

At block 1010, it can be determined whether there are any additional fleets to process. In particular, the management server 140 can determine whether there are any additional fleets to process. For example, if there were a hundred fleets, the management server 140 could process each fleet from the hundred fleets. If there is an additional fleet, the process of FIG. 10 can return to the previous blocks 1006, 1008 for determining attributes and metrics for the additional fleet. As shown, the process can repeat in a loop until there are no additional fleets. If there are no additional fleets, the process of FIG. 10 can proceed to the next block 1012.

At block 1012, cohorts can be determined. In particular, the management server 140 can determine cohorts based at least in part on the segmentation attributes. For example, a cohort can be associated with logic that determines whether a fleet is within a cohort or not. As described herein, an example set of segmentation attributes can include a first attribute indicating a distance driven per vehicle in the fleet, a second attribute indicating a trip length of the fleet, a third attribute indicating a vehicle type composition of the fleet, and a fourth attribute indicating a type of geography associated with the fleet. Table 1 below illustrates an example set of cohorts and the associated logic for each cohort to categorize a particular fleet.

TABLE 1

| Cohort ID | Vehicle Type Composition | Distance Driven Per Vehicle | Trip Length | Type of Geography (Percent City Trips) |
|---|---|---|---|---|
| 1 | Primarily heavy duty | Moderate (106 mi) | Long (53 mi) | 15% |
| 2 | Primarily heavy duty | High (168 mi) | Medium (29 mi) | 15% |
| 3 | Primarily heavy duty | Moderate (56 mi) | Short (16 mi) | 18% |
| 4 | Primarily heavy duty | Very high (258 mi) | Long (62 mi) | 14% |
| 5 | Mixed | Moderate (111 mi) | Medium (25 mi) | 16% |
| 6 | Mixed | Moderate (61 mi) | Short (12 mi) | 19% |
| 7 | Mixed | Low (23 mi) | Short (6 mi) | 17% |
| 8 | Mixed | Low (22 mi) | Short (17 mi) | 19% |
| 9 | Primarily passenger | Moderate (97 mi) | Medium (21 mi) | 18% |
| 10 | Primarily passenger | Low (25 mi) | Short (5 mi) | 23% |
| 11 | Primarily passenger | Low (18 mi) | Short (15 mi) | 23% |
| 12 | Primarily passenger | Moderate (55 mi) | Short (10 mi) | 22% |

The management server 140 can determine a cohort for a particular fleet based at least on the segmentation attributes for that fleet. For example, the management server 140 can apply the cohort logic (such as logic corresponding to Table 1) to determine the cohort for a fleet. In Table 1, the textual descriptors (such as "Primarily heavy duty," "Mixed," "Primarily passenger," "Low," "Moderate," "High," "Very high," "Short," "Medium," and "Long") can be for human readability purposes, but the management server 140 can use actual value thresholds for the segmentation attributes to categorize a particular fleet. For example, for the vehicle type composition attribute, "Primarily heavy duty" can correspond to fleets that have less than 30, 40, or 45 percent of passenger vehicles in their fleet; "Mixed" can correspond to fleets that have between, 45 and 55 or 40 and 60 percent of passenger vehicles in their fleet; and "Primarily passenger" can correspond to fleets that have more than 60, 70, or 80 percent of passenger vehicles in their fleet. In a similar manner, the values in Table 1 can represent averages of the thresholds for each segmentation attribute. For example, for the distance driven per vehicle attribute, the "106 mi" in Table 1 can represent that fleets with distance driven per vehicle attributes between 100 miles and 112 miles could fall into the Cohort 1 category in Table 1; for the trip length attribute, the "53 mi" in Table 1 can represent that fleets with trip length attributes between 50 miles and 56 miles could fall into the Cohort 1 category in Table 1; and for the type of geography attribute, the "15%" in Table 1 can represent that fleets with percentage of trips starting or ending in a city between 14 and 16 percent could fall into the Cohort 1 category in Table 1. Additional details regarding determining the cohorts and the thresholds in Table 1 are described in further detail below with respect to FIG. 11.

Additionally or alternatively, cohorts can be determined based on segmentation based at least on segmentation attributes different than the attributes in Table 1. For example, a cohort can be determined based at least on a weather-related attribute, such as percent of operations in ideal, moderate, or harsh climates. Thus, fleets that operate in harsh climates can be in a different cohort than fleets that operate in more temperate climates, for example.

At block 1014, a benchmark can be determined. In particular, the management server 140 can determine a benchmark for each cohort or other grouping of fleets. The benchmark for a cohort or other grouping can correspond to a metric for a fleet. Example benchmarks can include safety benchmark, such as harsh brake, harsh acceleration, and/or speeding benchmarks. Additional example benchmarks can be associated with cruise control use, coasting, accelerator pedal use, idling, battery state, anticipation, motor rotations per minute, motor power, fuel level, engine RPM, engine torque, engine load, and/or brake use. In particular, an example harsh brake benchmark can include a harsh brake events per 1,000 miles driven benchmark; an example harsh acceleration benchmark can include a harsh acceleration events per 1,000 miles driven benchmark; and example speeding benchmarks can include benchmarks that indicate a category of speeding, such as light speeding, moderate speeding, heavy speeding, and severe speeding. Example benchmarks are shown and described above with respect to FIGS. 9A, 9B, 9C, 9D, and 9E. In some embodiments, the management server 140 can determine benchmarks by aggregating the metrics from the fleets in each cohort or other grouping. In other embodiments, the management server 140 can determine benchmarks by aggregating the vehicle metric data from the fleets in each cohort or other grouping. Accordingly, the management server 140 can determine benchmarks in a similar manner described above with respect to block 1006 for determining metrics. As described herein, other groupings can include the top ten percent of fleets in the cohort or top ten percent of all fleets.

At block 1016, the metrics and benchmarks can be presented. In particular, the management server 140 can present the metrics and benchmarks in graphical user interfaces. Example graphical user interfaces are described in further detail above with respect to FIGS. 9A, 9B, 9C, 9D, 9E. In particular, the management server 140 can cause presentation, in the graphical user interface (such as the graphical use interfaces 900, 910, 920, 930, 940 of FIGS. 9A, 9B, 9C, 9D, 9E), of visualizations for a fleet, where each of the visualizations indicates a metric for the fleet relative to a benchmark for the cohort for the fleet. An example visualization can indicate a first metric for the first fleet relative to a first benchmark for the fleet's cohort, where first metric indicates a value of at least one of harsh acceleration events, harsh braking events, or speeding for the fleet relative to the first benchmark for the fleet's cohort. A visualization can a graph and each of the metric and the benchmark can be visually represented on the graph. As described herein, the graphical user interfaces can be interactive. For example, a user can select the comparison element 902 in FIG. 9A to cause the graphical user interface to dynamically update.

XII. EXAMPLE COHORT DETERMINATION

Figure 11:
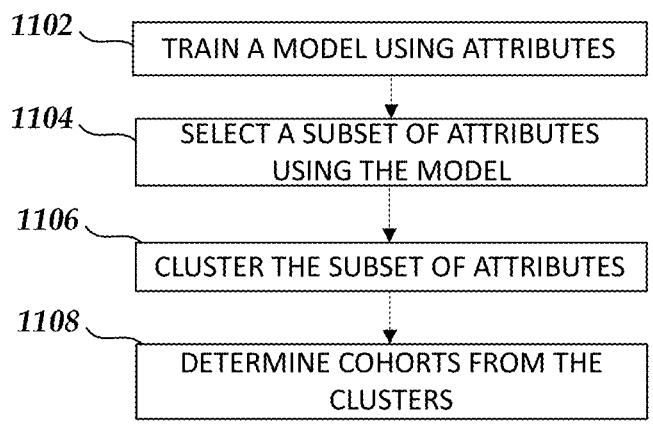
FIG. 11 is a flowchart illustrating example methods and functionality related to determining cohorts, according to various embodiments of the present disclosure.

FIG. 11 is a flowchart illustrating example methods and functionality related to determining cohorts. In particular, the block(s) of FIG. 11 can be performed at the block 1012 of FIG. 10 for determining cohorts.

Beginning at block 1102, a model is trained using the segmentation attributes. In particular, the management server 140 can train a model using the segmentation attributes. The segmentation attributes can be the same attributes from block 1006 of FIG. 10 for determining attributes. An example model can be a tree-based model, such as a random forest model. For example, the management server 140 can provide the segmentation attributes as feature input and the metrics (such as a value of at least one of harsh acceleration events, harsh braking events, or speeding) as label input to the tree-based model, such as the random forest model.

An example set of input segmentation attributes to the model can include a first attribute indicating a distance driven per unit of time, a second attribute indicating a distance driven per vehicle, a third attribute indicating a trip length, a fourth attribute indicating number of trips per unit of time, a fifth attribute indicating number of trips per vehicle, a sixth attribute indicating total trip duration per unit of time, a seventh attribute indicating total trip duration per vehicle, an eighth attribute indicating a number of vehicles in the fleet, a ninth attribute indicating a vehicle type composition of the fleet, and a tenth attribute indicating a type of driving. Another example set of input segmentation attributes to the model can include a first attribute indicating a first driving characteristic, a second attribute indicating a second driving characteristic, a third attribute indicating fleet size, a fourth attribute indicating fleet composition, and a fifth attribute indicating a type of geography associated with the fleet. Different sets of attributes can be used as input to the model, such as sets that have more or less attributes than the example sets provided herein.

A model, such as tree-based model, can be used to determine cohorts by using the segmentation attributes (such as trip length, distance driven per vehicle, etc.) to try to predict metrics (such as number of harsh acceleration events, percentage time spent speeding, etc.). Building the model, such as a tree-based model, is a way to evaluate how important each feature/attribute in relation to the metric that is trying to be predicted. For example, the management server 140 can use a random forest model to determine feature importance, which can be used for ranking the attributes. Example methods for determining feature importance can include (i) mean decrease impurity and (ii) mean decrease accuracy.

Random forest models consist of a number of decision trees. Every node in the decision trees can be a condition on a single feature, designed to split the dataset into two so that similar response values end up in the same set. The measure based on which the (locally) optimal condition is chosen can be called impurity. Thus, when the management server trains the tree model, the management server 140 can compute how much each feature decreases the weighted impurity in the tree. For a random forest model, the impurity decrease from each feature can be averaged and the features can be ranked according to this measure.

Another example method for determining feature importance can be to directly measure the impact of each feature on accuracy of the model. The management server 140 can permute the values of each feature and measure how much the permutation decreases the accuracy of the model. Accordingly, for unimportant variables, the permutation should have little to no effect on model accuracy, while permuting important variables should significantly decrease it.

Example tables showing the feature importance of some attributes for metrics are provided below. Table 2 can provide examples of feature importance for a harsh acceleration metric. Based on the feature importance values from Table 2, fleet size may be the least important attribute in that set of attributes for predicting the harsh acceleration metric (because the feature importance value for fleet size may be the lowest relative to the other values). Table 3 can provide examples of feature importance for a harsh brake metric. Based on the feature importance values from Table 3, fleet size (again) may be the least important attribute in that set of attributes for predicting the harsh brake metric. Table 4 can provide examples of feature importance for a severe speeding metric. Based on the feature importance values from Table 4, fleet size (yet again) may be the least important attribute in that set of attributes for predicting the harsh brake metric.

TABLE 2

| Attribute | Feature Importance |
| --- | --- |
| Distance Driven Per Vehicle | 0.148790 |
| Fleet Size | 0.062060 |
| Type of Geography (Percent City Trips) | 0.078028 |
| Trip Length | 0.517836 |
| Vehicle Type Composition | 0.193286 |

TABLE 3

| Attribute | Feature Importance |
| --- | --- |
| Distance Driven Per Vehicle | 0.212350 |
| Fleet Size | 0.097841 |
| Type of Geography (Percent City Trips) | 0.126926 |
| Trip Length | 0.433130 |
| Vehicle Type Composition | 0.129753 |

TABLE 4

| Attribute | Feature Importance |
| --- | --- |
| Distance Driven Per Vehicle | 0.219720 |
| Fleet Size | 0.118580 |
| Type of Geography (Percent City Trips) | 0.202688 |
| Trip Length | 0.276252 |
| Vehicle Type Composition | 0.182759 |

At block 1104, a subset of attributes can be selected using the model. In some embodiments, an analyst can select the subset of attributes based at least in part on the model. An analyst could select, from the set of segmentation attributes, a subset of attributes based at least in part on a ranking of the segmentation attributes indicated by the tree-based model, such as the random forest model. In particular, the analyst could select those segmentation attributes with the highest feature importance values described in the previous block 1102. Additionally or alternatively, the management server 140 can select the subset of attributes based at least in part on the model, such as by selecting those segmentation attributes with the highest feature importance values described in the previous block 1102. The management server 140 could, for example, have thresholds for how many segmentation attributes to select or a threshold value that a feature importance value must reach to be selected. Additional analysis can be used to determine the subset of attributes. For example, the management server 140 can perform multivariate linear regression to predict multiple correlated dependent variables. The results from the model training and analysis can yield unintuitive results, such as fleet size and fleet industry to have relatively low importance for influencing certain metrics. In some embodiments, the subset of attributes can be selected to minimize co-linearity among the different segmentation attributes, so as not to be too heavily correlated.

As described herein, a first example input set of segmentation attributes for a fleet can include a first attribute indicating a distance driven per unit of time, a second attribute indicating a distance driven per vehicle, a third attribute indicating a trip length, a fourth attribute indicating number of trips per unit of time, a fifth attribute indicating number of trips per vehicle, a sixth attribute indicating total trip duration per unit of time, a seventh attribute indicating total trip duration per vehicle, an eighth attribute indicating a number of vehicles in the fleet, a ninth attribute indicating a vehicle type composition of the fleet, and a tenth attribute indicating a type of driving. As described herein, a second example input set of segmentation attributes can include a first attribute indicating a first driving characteristic, a second attribute indicating a second driving characteristic, a third attribute indicating fleet size, a fourth attribute indicating fleet composition, and a fifth attribute indicating a type of geography associated with the fleet. In either case, the subset of attributes, selected from the input set of attributes, can include an attribute indicating a distance driven per vehicle in the fleet, an attribute indicating a trip length of the fleet, an attribute indicating a vehicle type composition of the fleet, and an attribute indicating a type of geography associated with the fleet.

At block 1106, the subset of attributes can be clustered. In particular, the management server 140 can cluster the subset of attributes for several fleets that results in clusters. An example method of clustering that the management server 140 can use is a k-means clustering algorithm. In a clustering context, a centroid is a location representing the center of the cluster. An example k-means clustering algorithm can consist of the following steps: 1. Choose a value for K (the number of clusters to be determined); 2. For each of the K clusters, randomly or pseudo-randomly choose an arbitrary point from the dataset as the initial center; 3. For each instance (a data point representing subset of attribute values for a fleet), calculate the Euclidean distance between the instance and each of the cluster centers, and assign the instance to the cluster center with smallest distance; 4. For each cluster, calculate a new mean (centroid) based on the instances now in the cluster; and 5. Repeat steps 3-4 with the new set of means until there is no change in the centroids or a threshold limit of iterations has been reached. In some embodiments, the clusters can be visualized in a graphical user interface. Visualization of the clusters in a graphical user interface may allow an analyst to sanity check the clusters to be used as cohorts.

The management server 140 may have to perform some transformations on the subset of attributes before clustering. For example, the management server 140 can apply a transformation function to the subset of attributes that results in transformed attributes, and then the management server 140 can cluster the transformed attributes. The transformation function(s) can include at least one of a logarithmic function or a z-score function. The logarithmic transformation can be used to make relatively skewed distributions in the attribute data less skewed, which can be valuable for clustering purposes.

At block 1108, the cohorts can be determined from the clusters. In particular, a management server 140 and/or an analyst can determine the cohorts from the clusters. For example, each cluster can represent a cohort, where the boundary values for the attributes in each cluster can specify the criteria to be used for a cohort. Example boundary values are provided in Table 1, which can be derived from the clusters. In some embodiments, an analyst can review the clusters and approve their use as cohorts. Accordingly, the management server 140 can determine a set of fleets associated with each cluster. Thus, the management server 140 can assign each fleet to a particular cohort, which can correspond to a specific cluster. As described herein, the cohort can be used for benchmarking purposes.

XIII ADDITIONAL IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java®, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as macOS®, iOS, Android®, Chrome OS™, Windows® OS (e.g., Windows XP®, Windows Vista®, Windows 7, Windows 8, Windows 10, Windows Server®, etc.), Windows CE®, Unix®, Linux®, SunOS, Solaris®, Blackberry® OS, VxWorks®, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

While many of the embodiments described herein relate to attributes and benchmarks for fleets, some embodiments can include driver attributes and benchmarks. For example, many of the techniques described herein for determining attributes, cohorts, metrics, and benchmarks for fleets can be applied to determining attributes, cohorts, metrics, and benchmarks for drivers. Thus, a particular driver can be compared to an "average" driver or to the top 10 percent of drivers in fleets similar to the particular driver's fleet.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a first vehicle gateway device comprising a first processor configured to gather and transmit first vehicle metric data associated with a first vehicle; and
   a computing device comprising:
      a computer readable storage medium having program instructions embodied therewith; and
      one or more processors configured to execute the program instructions to cause the computing device to:
         receive, from the first vehicle gateway device, the first vehicle metric data associated with the first vehicle;
         receive additional vehicle metric data from a plurality of vehicle gateway devices associated with a plurality of vehicles;
         determine a plurality of fleets, wherein each vehicle from the first vehicle and the plurality of vehicles is associated with a fleet from the plurality of fleets;
         for each fleet from the plurality of fleets,
            determine a plurality of segmentation attributes from the first vehicle metric data and the additional vehicle metric data, the plurality of segmentation attributes comprising:
               a first attribute indicating a distance driven per vehicle,
               a second attribute indicating a trip length, wherein the trip length indicates a distance,
               a third attribute indicating a vehicle type composition of the fleet, and
               a fourth attribute indicating a type of geography;
            determine a first cohort for a first fleet from the plurality of fleets based at least in part on the plurality of segmentation attributes; and
            present, in a graphical user interface, a plurality of visualizations for the first fleet, wherein each visualization from the plurality of visualizations indicates a metric for the first fleet relative to a benchmark for the first cohort.

2. The system of claim 1, wherein determining the plurality of segmentation attributes further comprises:
   calculating a value of distance driven per unit of time by vehicles from the fleet over a period of time; and
   assigning the value to the first attribute.

3. The system of claim 1, wherein determining the plurality of segmentation attributes further comprises:
   calculating a value representing the vehicle type composition of the fleet based at least in part on vehicle gateway devices with respective connections to the vehicles from the fleet, wherein calculating the value further comprises: determining an indicator that each respective connection uses a passenger cable; and
   assigning the value to the third attribute.

4. The system of claim 3, wherein the passenger cable corresponds to an OBD-II cable.

5. The system of claim 1, wherein determining the plurality of segmentation attributes further comprises:
   calculating a value representing the type of geography based at least in part on vehicles from the fleet that started or ended a trip in a city from a plurality of predetermined cities; and
   assigning the value to the fourth attribute.

6. The system of claim 1, wherein a first visualization from the plurality of visualizations indicates a first metric for the first fleet relative to a first benchmark for the first cohort, wherein the first metric indicates a value of at least one of harsh acceleration events, harsh braking events, or speeding for the first fleet relative to the first benchmark for the first cohort.

7. A method comprising:
   receiving vehicle metric data from a plurality of vehicle gateway devices associated with a plurality of vehicles;
   determining a plurality of fleets, wherein each vehicle from the plurality of vehicles is associated with a fleet from the plurality of fleets;
   for each fleet from the plurality of fleets, determining a plurality of segmentation attributes from the vehicle metric data, the plurality of segmentation attributes comprising:
      a first attribute indicating a distance driven per unit of time,
      a second attribute indicating a distance driven per vehicle,
      a third attribute indicating a trip length, wherein the trip length indicates a distance,
      a fourth attribute indicating number of trips per unit of time,
      a fifth attribute indicating number of trips per vehicle,
      a sixth attribute indicating total trip duration per unit of time,
      a seventh attribute indicating total trip duration per vehicle,
      an eighth attribute indicating a number of vehicles in the fleet,
      a ninth attribute indicating a vehicle type composition of the fleet, and
      a tenth attribute indicating a type of driving;

training a random forest model based at least in part on the plurality of segmentation attributes;

selecting, from the plurality of segmentation attributes, a subset of attributes based at least in part on a ranking of the plurality of segmentation attributes indicated by the random forest model;

clustering the subset of attributes that results in a plurality of clusters;

determining a first plurality of fleets associated with a first cluster from the plurality of clusters;

assigning the first plurality of fleets to a first cohort, wherein the first cohort comprises a first fleet; and presenting, in a graphical user interface, a plurality of visualizations for the first fleet, wherein each visualization from the plurality of visualizations indicates a metric for the first fleet relative to a benchmark for the first cohort.

8. The method of claim 7, further comprising:

applying a transformation function to the subset of attributes that results in transformed attributes, wherein clustering the subset of attributes further comprises clustering the transformed attributes.

9. The method of claim 8, wherein the transformation function comprises at least one of a logarithmic function or a z-score function.

10. The method of claim 7, further comprising: causing presentation, in another graphical user interface, of the plurality of clusters.

11. The method of claim 7, wherein training the random forest model further comprises:

providing the plurality of segmentation attributes as feature input and a plurality of metrics as label input to the random forest model.

12. The method of claim 11, wherein a first metric of the plurality of metrics comprises a value of at least one of harsh acceleration events, harsh braking events, or speeding.

13. The method of claim 7, wherein determining the plurality of fleets further comprises:

calculating a value from respective vehicle metric data associated with a second fleet;

determining that the value fails to satisfy a threshold; and in response to determining that the value fails to satisfy the threshold, excluding the second fleet from the plurality of fleets.

14. A method comprising:

receiving vehicle metric data from a plurality of vehicle gateway devices associated with a plurality of vehicles;

determining a plurality of fleets, wherein each vehicle from the plurality of vehicles is associated with a fleet from the plurality of fleets;

for each fleet from the plurality of fleets, determining a plurality of segmentation attributes from the vehicle metric data, the plurality of segmentation attributes comprising:

a first attribute indicating a first driving characteristic, a second attribute indicating a second driving characteristic, a third attribute indicating fleet size, a fourth attribute indicating fleet composition, and a fifth attribute indicating a type of geography;

training a tree-based model based at least in part on the plurality of segmentation attributes;

selecting, from the plurality of segmentation attributes, a subset of attributes based at least in part on a ranking of the plurality of segmentation attributes indicated by the tree-based model;

clustering the subset of attributes that results in a plurality of clusters;

determining a first plurality of fleets associated with a first cluster from the plurality of clusters;

assigning the first plurality of fleets to a first cohort, wherein the first cohort comprises a first fleet; and presenting, in a graphical user interface, a visualization for the first fleet, wherein the visualization indicates a metric for the first fleet relative to a benchmark for the first cohort.

15. The method of claim 14, wherein the subset of attributes comprises the first attribute, the second attribute, the fourth attribute, and the fifth attribute, and wherein:

the first attribute indicates a distance driven per vehicle, and the second attribute indicates a trip length, wherein the trip length indicates a distance.

16. The method of claim 14, wherein training the tree-based model further comprises:

providing the plurality of segmentation attributes as feature input and a plurality of metrics as label input to the tree-based model.

17. The method of claim 16, wherein a first metric of the plurality of metrics comprises a value of at least one of harsh acceleration events, harsh braking events, or speeding.

18. The method of claim 14, wherein determining the plurality of fleets further comprises:

calculating a value from respective vehicle metric data associated with a second fleet;

determining that the value satisfies a threshold; and in response to determining that the value satisfies the threshold, including the second fleet in the plurality of fleets.

19. The method of claim 14, wherein the metric indicates a value of at least one of harsh acceleration events, harsh braking events, or speeding for the first fleet relative to the benchmark for the first cohort.

20. The method of claim 14, wherein the visualization comprises a graph and each of the metric and the benchmark are visually represented on the graph.

* * * * *